United States Patent
King et al.

(10) Patent No.: US 11,118,536 B2
(45) Date of Patent: Sep. 14, 2021

(54) TAMPER RESISTANT ADJUSTMENT VALVE FOR A CHARGE FORMING DEVICE

(71) Applicant: Walbro LLC, Tucson, AZ (US)

(72) Inventors: Eric L. King, Caro, MI (US); George M. Pattullo, Caro, MI (US)

(73) Assignee: Walbro LLC, Cass City, MI (US)

( * ) Notice: Subject to any disclaimer, the term of this patent is extended or adjusted under 35 U.S.C. 154(b) by 0 days.

(21) Appl. No.: 16/708,537

(22) Filed: Dec. 10, 2019

(65) Prior Publication Data

US 2020/0191095 A1 Jun. 18, 2020

Related U.S. Application Data

(60) Provisional application No. 62/790,172, filed on Jan. 9, 2019, provisional application No. 62/780,529, filed on Dec. 17, 2018.

(51) Int. Cl.
| | |
|---|---|
| F02M 19/04 | (2006.01) |
| F02M 9/08 | (2006.01) |
| B01F 3/04 | (2006.01) |
| F02M 19/01 | (2006.01) |
| F16K 31/44 | (2006.01) |

(52) U.S. Cl.
CPC ......... *F02M 19/01* (2013.01); *B01F 3/04049* (2013.01); *F02M 9/08* (2013.01); *F02M 19/04* (2013.01); *F16K 31/44* (2013.01)

(58) Field of Classification Search
CPC .... B01F 3/04; B01F 3/04021; B01F 3/04049; F02M 9/08; F02M 19/04; F02M 19/01; F02M 9/085
See application file for complete search history.

(56) References Cited

U.S. PATENT DOCUMENTS

| | | | |
|---|---|---|---|
| 3,469,825 | A | 9/1969 | Dubois |
| 4,097,561 | A | 6/1978 | Seki et al. |
| 4,234,524 | A | 11/1980 | Arai |
| 4,271,093 | A | 6/1981 | Kobayashi |
| 4,271,095 | A | 6/1981 | Maeda |
| 4,283,353 | A | 8/1981 | Miller |
| 4,481,152 | A | 11/1984 | Kobayashi et al. |
| 4,481,153 | A | 11/1984 | Kobayashi et al. |
| 4,568,499 | A | 2/1986 | Wood |
| 4,759,883 | A | 7/1988 | Woody et al. |
| 5,262,092 | A | 11/1993 | Reeder et al. |
| 5,322,645 | A | 6/1994 | Hammett et al. |
| 5,599,484 | A | 2/1997 | Tobinai |

(Continued)

FOREIGN PATENT DOCUMENTS

JP H09158783 A 6/1997

*Primary Examiner* — Robert A Hopkins
(74) *Attorney, Agent, or Firm* — Reising Ethington P.C.

(57) ABSTRACT

In at least some implementations, a valve for a charge forming device, includes a needle having a first end and a second end, and a valve body. The valve body has an axis extending between a first end and a second end, and a cavity open to the second end and in which part of the needle is received with the second end of the needle extending out of the second end of the valve body. The valve body also has a projection extending axially from the first end of the valve body to a free end of the projection, and the valve body has at least one drive surface axially spaced from the free end, the drive surface extends axially and radially.

20 Claims, 20 Drawing Sheets

(56) References Cited

U.S. PATENT DOCUMENTS

| | | |
|---|---|---|
| 5,707,561 A | 1/1998 | Swanson |
| 5,709,822 A | 1/1998 | Togashi |
| 5,753,148 A | 5/1998 | King et al. |
| 5,776,379 A | 7/1998 | Bowles |
| 5,942,160 A | 8/1999 | Araki |
| 5,961,896 A | 10/1999 | Koizumi et al. |
| 5,984,281 A | 11/1999 | Hacker et al. |
| 6,003,845 A | 12/1999 | Kus |
| 6,234,458 B1 | 5/2001 | Gerhardy |
| 6,273,403 B1 | 8/2001 | Kahlhamer |
| 6,302,384 B1 | 10/2001 | Douyama |
| 6,402,124 B1 | 6/2002 | Pattullo et al. |
| 6,691,988 B1 | 2/2004 | Warfel et al. |
| 6,769,670 B2 | 8/2004 | Ohgane et al. |
| 6,796,551 B2 | 9/2004 | Warfel et al. |
| 6,945,520 B2 | 9/2005 | Ohgane et al. |
| 7,070,173 B2 | 7/2006 | Dow et al. |
| 7,097,165 B1 | 8/2006 | Braun |
| 7,475,871 B2 * | 1/2009 | Terakado ................ F02M 9/02 261/44.6 |
| 10,072,615 B2 * | 9/2018 | Pattullo ................ B01F 3/0446 |
| 2004/0007788 A1 | 1/2004 | Vimercati |

\* cited by examiner

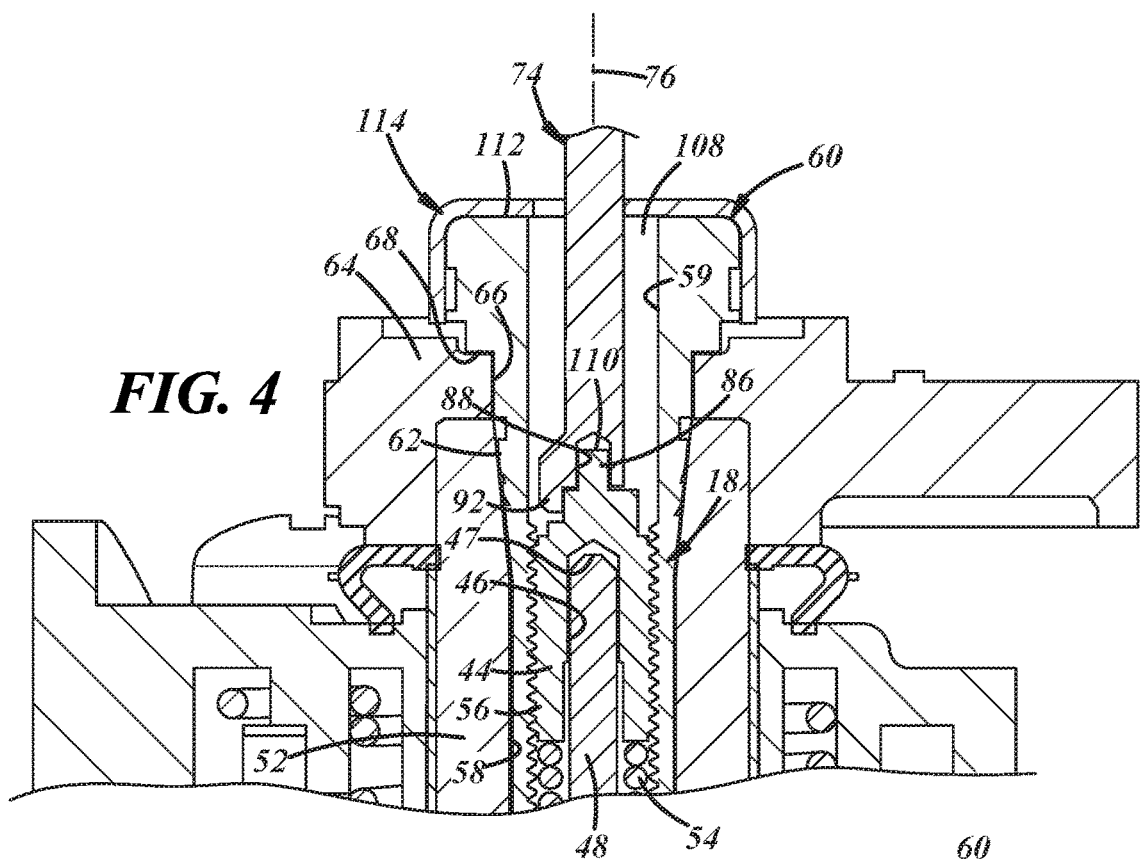
FIG. 4
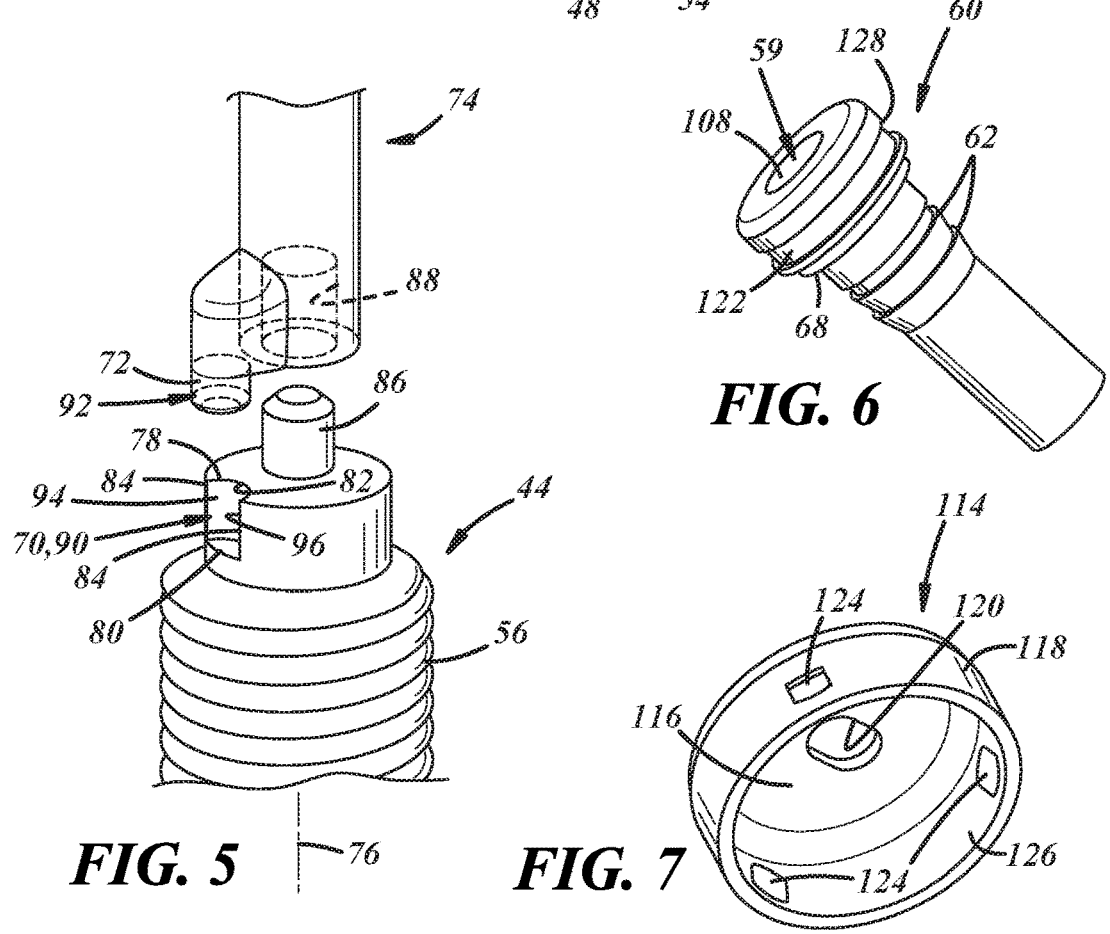
FIG. 5
FIG. 6
FIG. 7

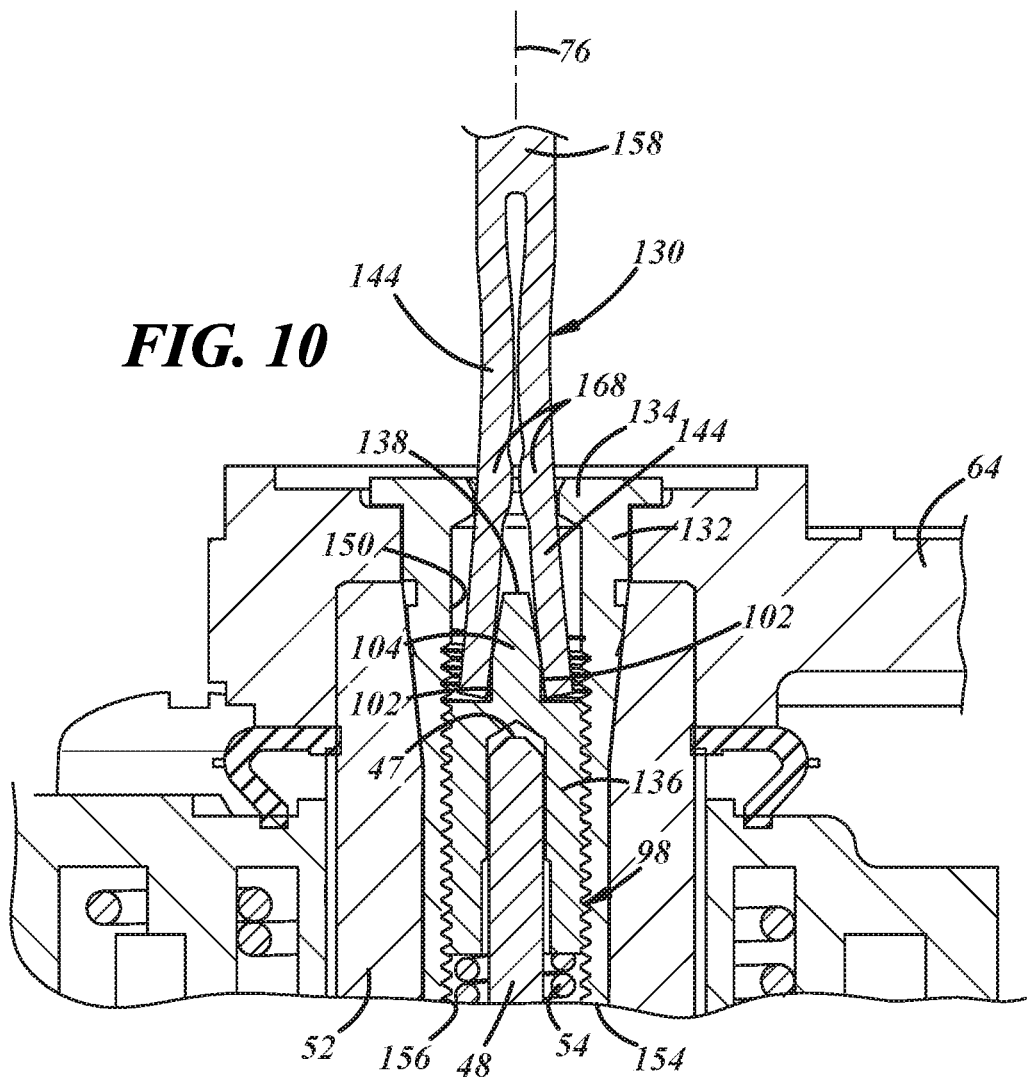
FIG. 10
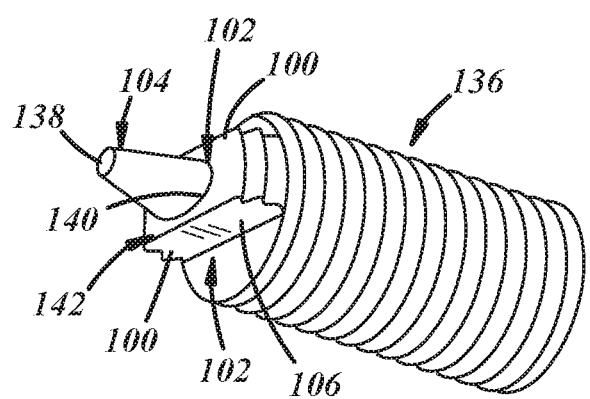
FIG. 12
FIG. 11

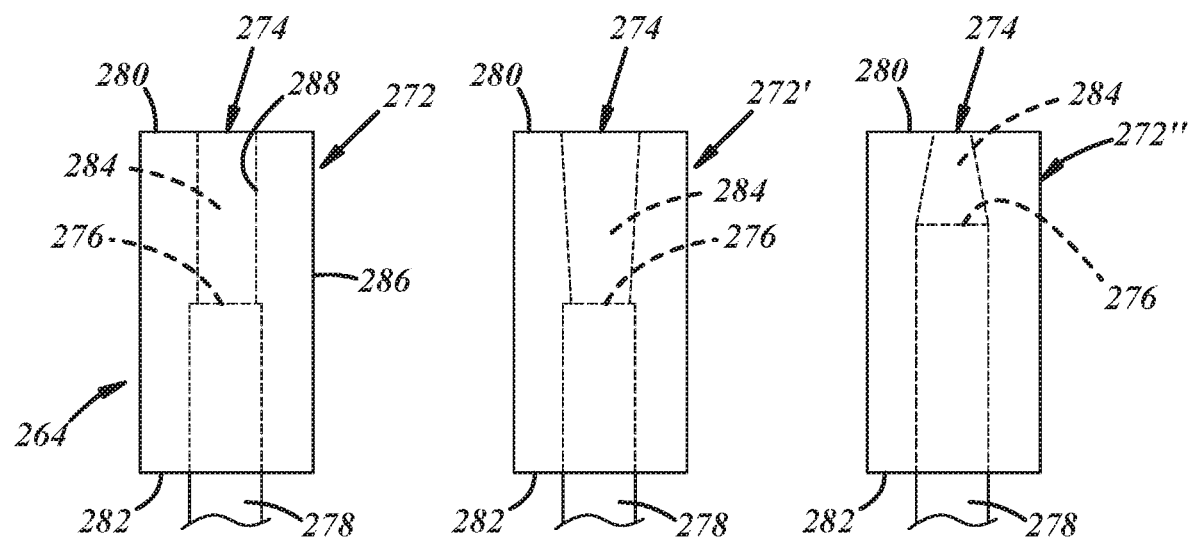
FIG. 31  FIG. 32  FIG. 33
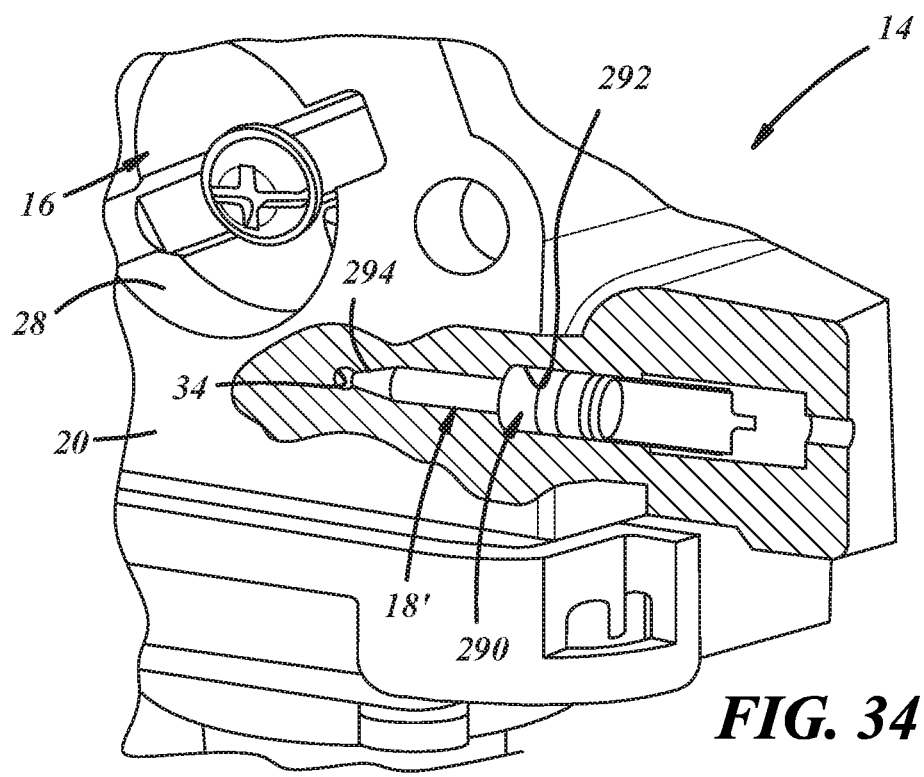
FIG. 34

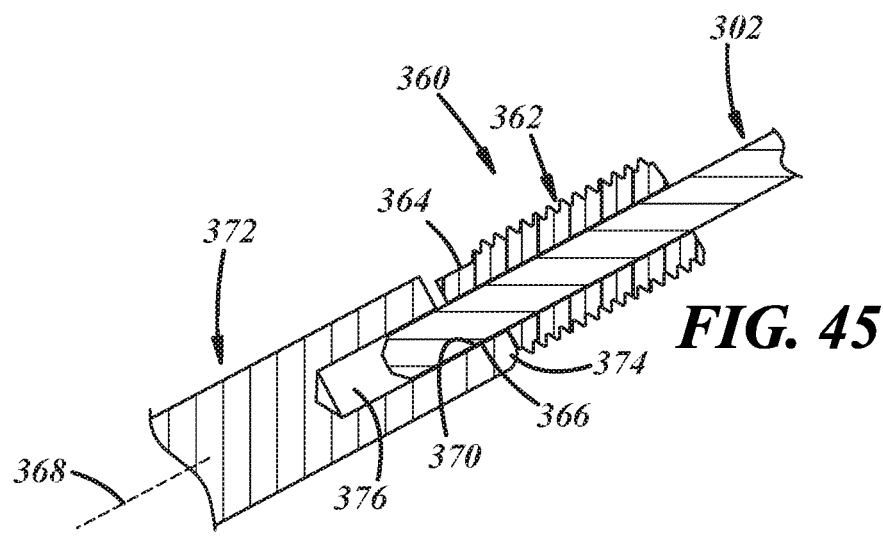
FIG. 45
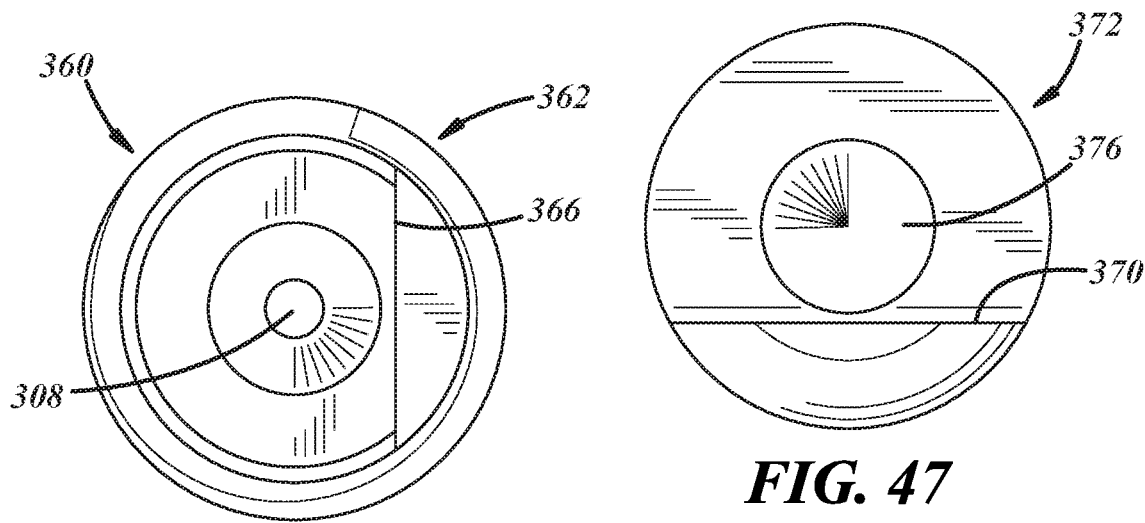
FIG. 46
FIG. 47
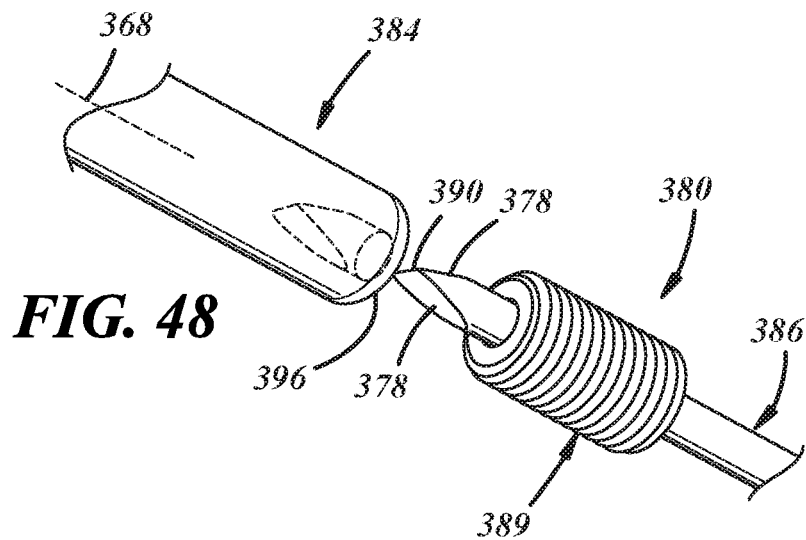
FIG. 48

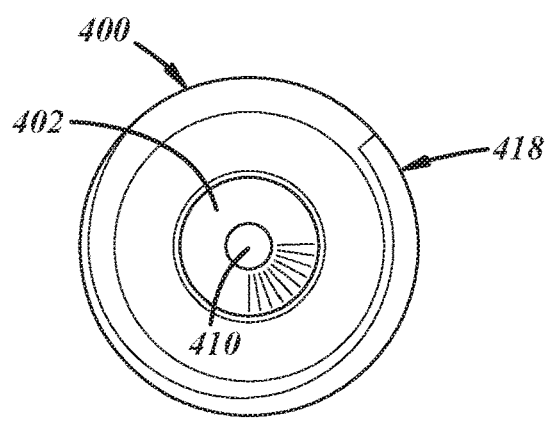
FIG. 54
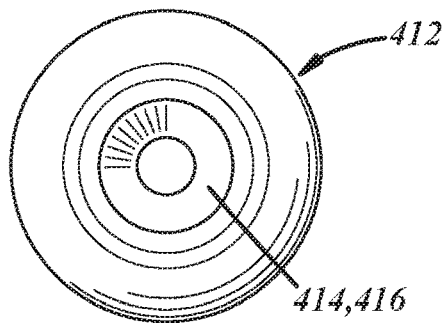
FIG. 55
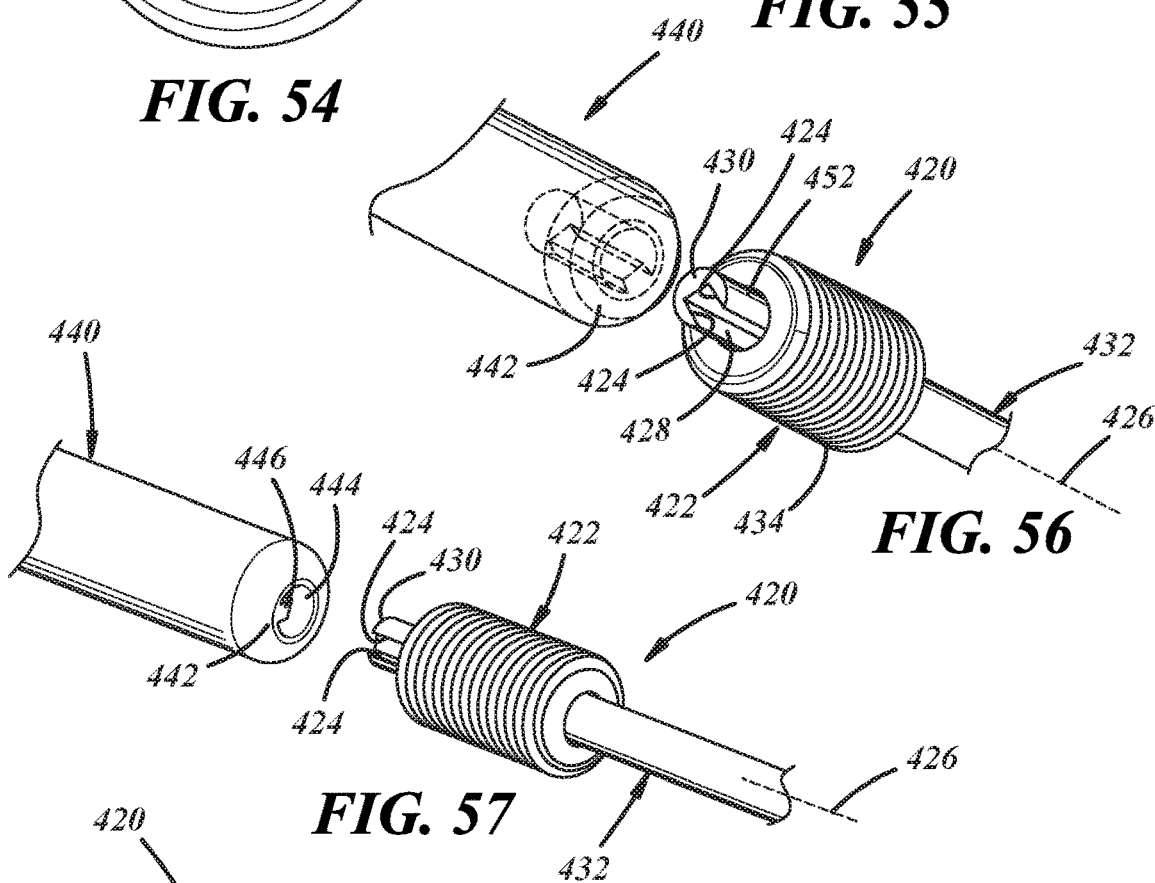
FIG. 56
FIG. 57
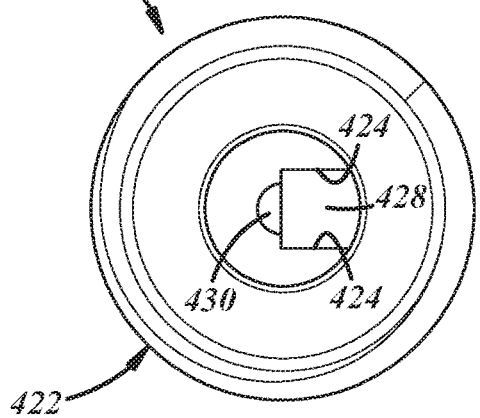
FIG. 58
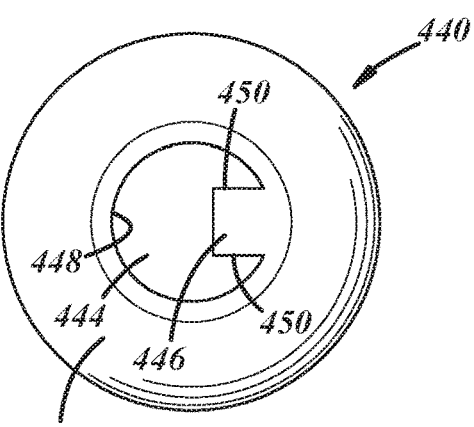
FIG. 59

TAMPER RESISTANT ADJUSTMENT VALVE FOR A CHARGE FORMING DEVICE

REFERENCE TO RELATED APPLICATIONS

This application claims the benefit of U.S. Provisional Application Ser. No. 62/790,172 filed on Jan. 9, 2019 and 62/780,529 filed on Dec. 17, 2018, the entire contents of which are incorporated herein by reference in their entireties.

TECHNICAL FIELD

The present disclosure relates generally to mixture needles for a charge forming device such as a carburetor.

BACKGROUND

Government agencies of an increasing number of countries are applying exhaust emission control regulations to combustion engines including engines used in marine, lawn and garden and recreational equipment such as outboard motors, garden tractors, chain saws, lawn mowers, hedge trimmers, snowmobiles and personal watercraft. One means of limiting excessive exhaust emissions in a small engine is to restrict the maximum amount of fuel delivered to the combustion chamber by a charge forming device such as a carburetor. This maximum fuel amount is pre-set for each individual engine by the engine manufacturer with the understanding that in many instances some later adjustment may be needed, for example, by a repair technician.

It may also be desirable to restrict minimum amounts of fuel, or the leanness of the fuel to air mixture. Often a user will desire more power from a two-cycle engine and will attempt to operate the engine in a leaner state than desired by the engine manufacturer. This will cause a two-cycle engine to operate at a higher temperature and may decrease the engine's useful life. Therefore, known limiter caps are designed not only to restrict the carburetor to a maximum amount of fuel, but also to restrict the carburetor to a minimum amount of fuel.

In so-called rotary throttle valve carburetors, a main fuel needle may be carried by a throttle valve that both rotates and moves axially about the axis of rotation. The fuel needle moves relative to a fuel nozzle to control the extent of the nozzle that is open in a given throttle valve position. The fuel needle and a cavity within the throttle valve are often very small and it is difficult to provide a fuel needle with adjustment limiting features that is robust enough to survive installation and later adjustment without breaking. It can also be difficult to provide a tool that is small enough to interact with the needle valve in the small space and yet strong enough to rotate the needle without breaking.

SUMMARY

In at least some implementations, a valve for a charge forming device, includes a needle having a first end and a second end, and a valve body. The valve body has an axis extending between a first end and a second end, and a cavity open to the second end and in which part of the needle is received with the second end of the needle extending out of the second end of the valve body. The valve body also has a projection extending axially from the first end of the valve body to a free end of the projection, and the valve body has at least one drive surface axially spaced from the free end, the drive surface extends axially and radially.

In at least some implementations, the projection is defined by the needle and the first end of the needle defines the free end of the projection. In at least some implementations, the projection is coaxial with the valve body.

In at least some implementations, the valve body includes at least two drive surfaces that are defined on opposite sides of the projection. The drive surfaces may define at least part of a slot formed in the first end of the valve body. The drive surfaces may face inwardly toward axis, or outwardly away from the axis. The drive surfaces may extend radially beyond the projection. And the needle may define the projection and the first end of the needle may define the free end of the needle.

In at least some implementations, a portion of the exterior of the valve body is threaded. And the valve body may include a drive portion that extends axially from the threaded portion of the valve body.

In at least some implementations, a tool for rotating a valve that has a projection extending axially beyond a drive surface to be engaged by the tool, includes a body having an axis, one or more driving surfaces and a cavity formed in the body, the cavity extending axially into the body between the driving surfaces and arranged to receive at least part of the projection, the driving surfaces extending axially and radially and arranged to engage a surface of a valve upon rotation of the tool.

In at least some implementations, the driving surfaces face outwardly, away from the axis, or the driving surfaces face inwardly, toward from the axis. The driving surfaces may be arranged on opposite sides of the cavity.

In at least some implementations, the body includes a pair of fingers with the cavity extending between the fingers, and with the driving surfaces defined by the fingers. The axis may extend between the fingers and the driving surfaces may be parallel to the axis. The cavity may define part of the fingers.

In at least some implementations, a rotary throttle valve carburetor, includes a body, a throttle valve and an adjustment valve. The body defines a fuel and air mixing passage, a throttle valve chamber communicating with the fuel and air mixing passage and a fuel flow path communicating a supply of fuel with the fuel and air mixing passage. The throttle valve is rotatably and axially movably received in the throttle valve chamber and includes a throttle valve passage variably aligned with the fuel and air mixing passage. The adjustment valve is threadedly carried by the carburetor in communication with the fuel flow path to restrict fuel flow through at least a portion of the fuel flow path in at least one position of the throttle valve, the adjustment valve has a valve body with a threaded portion, at least one drive surface defines a first engagement portion and a second engagement portion is radially spaced from the first engagement portion, the adjustment valve also has a needle carried by the valve body for movement with the valve body, and the adjustment valve has a projection extending axially from an end of the valve body and axially beyond the at least one drive surface. In at least some implementations, the throttle valve defines a cavity in which the valve body is received so that the at least one drive surface is located within the cavity and is surrounded by a body of the throttle valve.

BRIEF DESCRIPTION OF THE DRAWINGS

The following detailed description of certain embodiments and best mode will be set forth with reference to the accompanying drawings, in which:

FIG. 4 is an enlarged, fragmentary sectional view showing the engagement of the adjustment tool with the head of the adjustment valve;

FIG. 5 is enlarged, fragmentary perspective view showing a portion of the adjustment tool and corresponding, mating portion of the adjustment valve;

FIG. 6 is a perspective view of an insert carried by the throttle valve and in which the adjustment valve is carried;

FIG. 7 is a perspective view of a cover that may be installed over the insert providing a restriction of the open area of a cavity of the insert in which the adjustment valve is received;

FIG. 10 is a view similar to FIG. 9 showing the adjustment tool in a final position engaged with the head of the adjustment valve;

FIG. 11 is a perspective view of a portion of the adjustment valve showing the head and a portion of a threaded shank;

FIG. 12 is a perspective view of the adjustment tool;

FIG. 31 is a diagrammatic view of an insert and needle;

FIG. 32 is a diagrammatic view of an insert and needle wherein the insert has a cavity that decreases in size leading to the needle;

FIG. 33 is a diagrammatic view of an insert and needle wherein the insert has a cavity that increases in size leading to the needle;

FIG. 34 is a fragmentary perspective and partially sectioned view showing an adjustment valve in a carburetor having a butterfly throttle valve;

FIG. 45 is a side sectional view of the adjustment valve and tool of FIG. 44 showing the tool engaged with the adjustment valve;

FIG. 46 is an end view of the adjustment valve;

FIG. 47 is an end view of the tool;

FIG. 48 is a perspective, exploded view showing a portion of an adjustment valve and a tool that may be used to rotate the adjustment valve;

FIG. 54 is an end view of the adjustment valve;

FIG. 55 is an end view of the tool;

FIG. 56 is a perspective, exploded view showing a portion of an adjustment valve and a tool that may be used to rotate the adjustment valve;

FIG. 57 is a side sectional view of the adjustment valve and tool of FIG. 56;

FIG. 58 is an end view of the adjustment valve; and

FIG. 59 is an end view of the tool.

DETAILED DESCRIPTION

Figure 1:
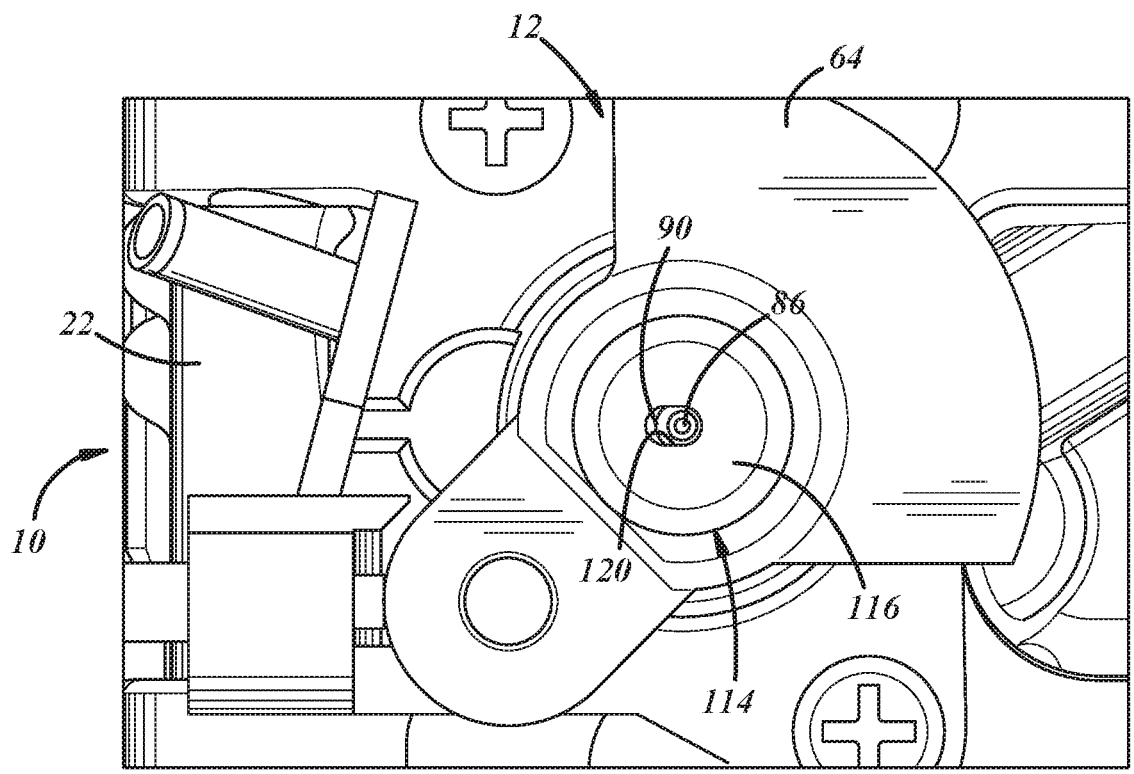
FIG. 1 is a plan view of a portion of a rotary throttle valve carburetor including an adjustment valve carried by the throttle valve.
Figure 2:
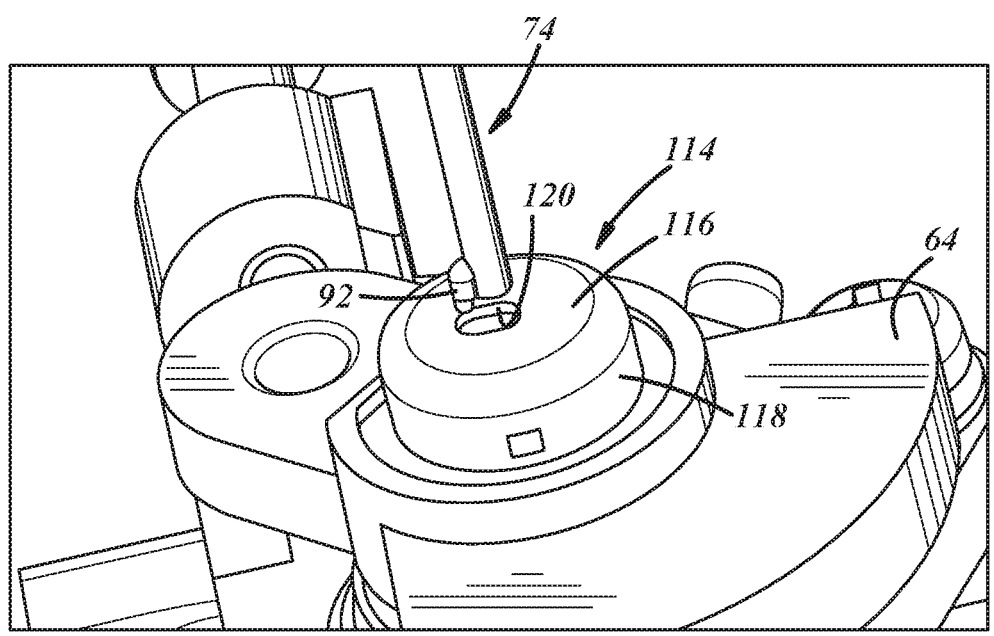
FIG. 2 is an enlarged, fragmentary perspective view showing a portion of the throttle valve and an adjustment tool prior to insertion into the throttle valve.

Referring in more detail to the drawings, FIGS. 1-4 show a carburetor 10 that provides a fuel and air mixture to an engine to support operation of the engine. The carburetor 10 may be a diaphragm type carburetor, as shown, or any other air-fuel charge forming device suitable for use as described herein. The carburetor 10 may include a rotary throttle valve 12 and may be constructed and function as generally set forth in U.S. Pat. No. 4,481,153, or a carburetor 14 may include a butterfly throttle valve 16 (as shown in FIG. 34) and may be constructed and function as generally set forth in U.S. Pat. No. 4,271,093, which patents are incorporated herein by reference in their entirety. As will be described herein, the carburetor 10 may have at least one adjustment valve 18 that is adjustable and which restricts the amount or flow rate of a fluid (air and/or fuel) delivered to the engine. The adjustment valve 18 may be a needle valve that is axially displaced relative to a passage or opening in the carburetor 10 through which air and/or fuel flows. FIGS. 1-3, 6-9, 13-16, 19-22, 24, 25, and 28-33 show various embodiments of adjustment valves (given various reference numbers in the description below) that may be carried by the throttle valve 12 in a rotary throttle valve carburetor 10, and as shown in FIG. 34, an adjustment valve 18' may be carried by a body 20 of the carburetor in a butterfly throttle valve carburetor 14. An adjustment valve carried by the body 22 of a rotary throttle valve carburetor 10 may also be used in similar manner as shown in FIG. 34. Further, the various embodiments of adjustment valves disclosed herein may be carried by the body of both carburetor types 10 and 14.

Figure 3:
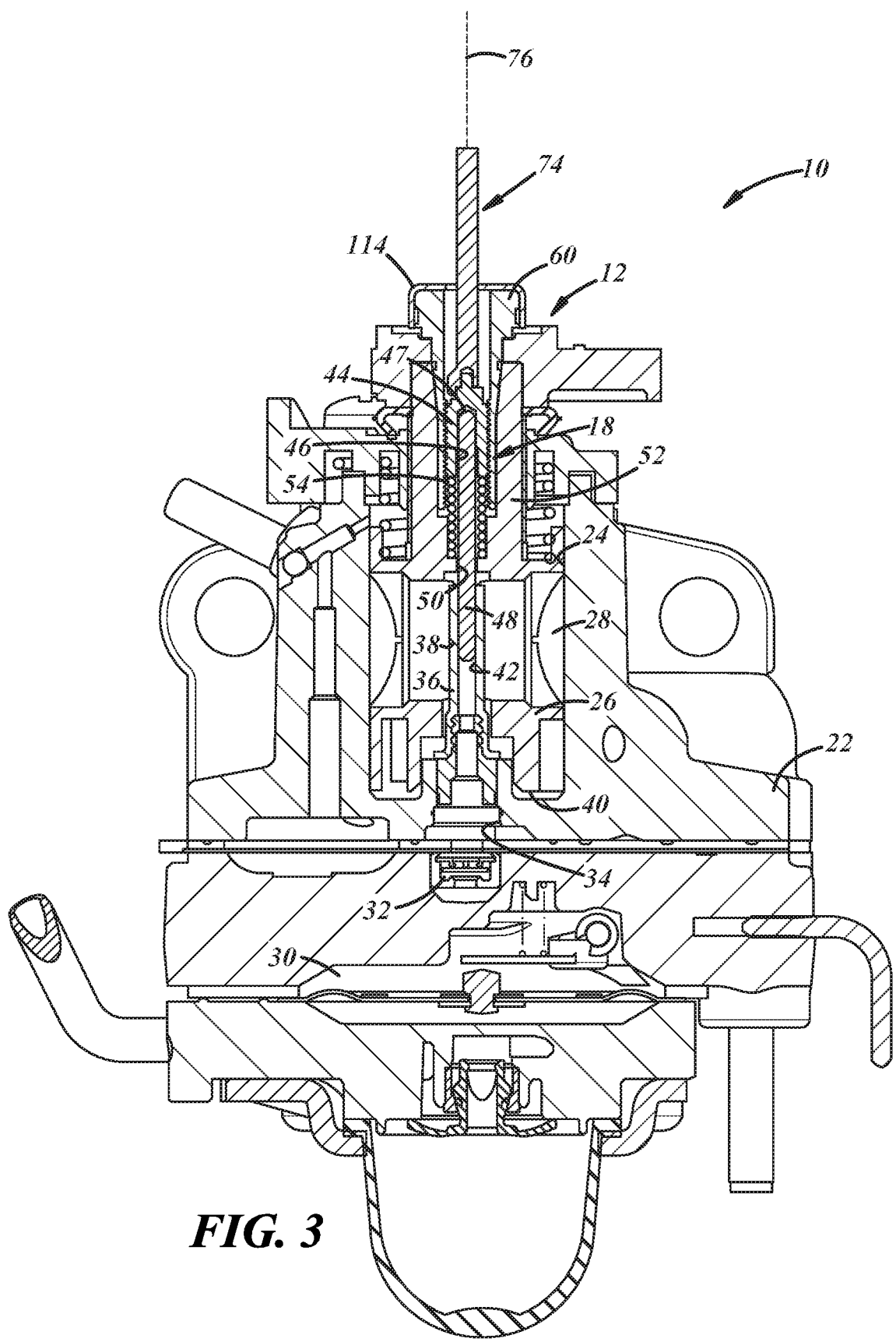
FIG. 3 is a sectional view of the carburetor showing the adjustment tool engaged with a head of the adjustment valve.

As shown in FIGS. 1-4, with particular reference to FIG. 3 which shows the entire carburetor 10, the rotary throttle valve carburetor 10 includes a body 22 defining a throttle valve chamber 24 in which a throttle valve 12 is rotatably and axially slidably received for movement between idle and wide-open throttle positions. The throttle valve 12 includes a passage 26 that, when the throttle valve is moved toward its wide-open position, is increasingly registered with a fuel and air-mixing passage 28 formed in the carburetor body 22, preferably generally perpendicular to and intersecting with the throttle valve chamber 24. Fuel is supplied from a fuel metering chamber 30 in the body 22 through a check valve 32, a fuel passage 34, and a main fuel nozzle 36 which has an orifice 38 open in the throttle valve chamber 24 and in communication with the fuel and air mixing passage 28. Fuel discharged from the orifice 38 is mixed with air flowing through the fuel and air mixing passage 28 and a fuel and air mixture is delivered to an engine to support operation of the engine.

The throttle valve 12 interacts with a cam 40 that axially displaces the throttle valve 12 as the throttle valve is rotated. As shown in FIG. 3, the throttle valve 12 preferably carries a cam surface 40 that engages a follower preferably disposed in a lower surface the throttle valve chamber 24 to provide the axial movement of the throttle valve 12. The throttle valve 12 preferably also carries an adjustment valve 18 that moves axially with the throttle valve 12 and relative to the main fuel nozzle 36 and its orifice 38. As best shown in FIG. 3, the adjustment valve 18 includes a needle 48 having a free end 42 of the adjustment valve 18 preferably is slidably received in an open end of the fuel nozzle 36. At least when the throttle valve 12 is in its idle position, the adjustment valve 18 restricts fluid flow through the orifice 38. As the throttle valve 12 is rotated away from its idle position, the adjustment valve 18 is axially displaced in a direction tending to withdraw the adjustment valve 18 from the fuel nozzle 36 and provide less restriction to fluid flow through the orifice 38.

The adjustment valve 18 may be formed in single piece of material, or may be an assembly as shown in FIGS. 3 and 4. The assembly may include a body 44 having a cavity 46 in which a first end 47 of the pin or needle 48 is inserted, such as by a press-fit, so that the body 44 and needle 48 move together and not relative to each other. The cavity 46 may be a blind bore that does not extend completely through the body 44 such that the first end 47 of the needle 48 is receiving within and does not extend fully through the body 44. The body 44 may be carried by or coupled to the throttle valve 12 and the needle 48 may extend through an opening 50 in a body 52 of the throttle valve 12 so that that the free or second end 42 of the needle 48 is received within the fuel nozzle 36. The adjustment valve 18 preferably is movably or adjustably carried by the throttle valve 12 to permit axial movement of the adjustment valve 18 relative to the throttle valve 12 and hence, change the position of the adjustment valve 18 relative to the orifice 38. This permits adjustment of the magnitude or degree of restriction of the orifice 38 caused by the adjustment valve 18 when the throttle valve 12 is in its idle position and usually, for at least some range of movement of the throttle valve 12 off idle wherein the adjustment valve 18 controls or provides some restriction to fluid flow through the orifice 38.

To permit adjustment of the adjustment valve 18, the body 44 preferably includes a threaded portion 56 that is received in a bore 58 in the throttle valve 12 at least a portion of which includes threads, or in a cavity 59 in an insert 60 that is fixed in the bore 58 of the throttle valve 12, such as by a press-fit, adhesive, weld, heat stake, fastener or any other desired manner. The threaded portion 56 may be part of the body 44 which may be formed integral with or, as shown in FIGS. 3-5, may separate from the needle 48. A spring 54 may engage the valve body 44 and the throttle valve body 52 or another component to provide a force on the valve body 44 that inhibits unintended movement of the valve body 44 due to, for example, vibrations. In at least some implementations, the insert 60 may be formed from metal and the portion of the throttle valve 12 in which the insert 60 is received may be formed from plastic or metal, as desired. The insert 60 may have outwardly extending barbs 62, as shown in FIGS. 4 and 6, that frictionally and positively retain the position insert relative to the throttle valve body. The throttle valve 12 may include a lever 64 to which an actuating cable is attached in known manner, and the insert 60 may be received through an opening 66 in the throttle valve lever 64 that is aligned with the insert cavity 59. The insert 60 may include a shoulder or other stop surface 68 that engages the throttle valve lever 64 to limit insertion of the insert 60 into the bore 58.

As shown in FIG. 5, the adjustment valve 18 may also include one or more drive features or drive surfaces 70 arranged or formed so that commonly available tools are not suitable for use in rotating and adjusting the adjustment valve 18. This inhibits end user movement of the adjustment valve 18 which, for example, can affect the performance of and emissions from an engine with which the carburetor 10 is used. As best shown in FIGS. 3-5, the adjustment valve 18, in at least some implementations, includes at least one drive surface 70 that is arranged for engagement with a driving surface 72 of a tool 74 so that the tool 74 can be used to rotate the adjustment valve 18 about an axis 76 of the adjustment valve 18, which may be coaxial with an axis of rotation of the throttle valve 12. In at least some implementations, the drive surface 70 extends axially and radially or has an axial extent and a radial extent. That is, the drive surface 70 need not extend parallel to the axis or along a radius, but has an axial dimension between spaced apart axial locations, such as at opposed axial ends 78, 80 (FIG. 5) of the drive surface 70, and a radial dimension between spaced apart radial locations, such as radial innermost and radial outermost portions (82, 84) of the drive surface 70. The drive surface 70 is arranged to be axially and radially overlapped by part of the tool 74 so that rotation of the tool 74 engages the driving surface(s) 72 with the drive surface(s) 70 of the adjustment valve 18 and rotates the adjustment valve.

In the example shown in FIGS. 1-5, the adjustment valve 18 includes a coaxially arranged support 86. The tool 74 may include a cavity or opening 88 that receives at least part of the support 86 and about which the tool 74 is rotated. The support 86 may thus guide or constrain rotation of the tool 74 about the axis 76, which may occur without driving engagement between the support 86 and tool 74. The support 86 may define an engagement portion of the adjustment valve 18 which is engaged by the tool 74 but which need not be driven by the tool by, for example, being circular in cross-section so that the tool 74 slidingly rotates relative to the support 86 in use. The drive surface(s) 70 also define(s) an engagement portion of the adjustment valve 18 that is arranged to engage a portion of the tool 74, but with driving engagement between the drive surface(s) 70 and the tool 74 so that the tool can rotate the adjustment valve 18.

The drive feature or drive surface 70 is radially spaced from the axis 76, and in at least some implementations, is defined by one or more surfaces of the valve body 44 that define a void 90. The void 90 may have an axially facing entrance at the first axial end 80 that faces toward the open end of the insert 60 and which may be formed in a first end of the valve body 44 that includes the support 86. The void 90 may receive or be overlapped by a portion of the tool 74, which may include a projection 92 that during adjustment is at least partially axially and radially overlapped by the drive surface 70. Further, the drive surface 70 may radially overlap the tool portion or projection 92 at two opposed locations so that a first portion 94 of the drive surface 70 confronts and is engaged by the radial outer surface of the projection 92, which defines the driving surface 72 in this implementation, upon rotation of the tool 74 in a first direction and a second portion 96 of the drive surface 70 confronts and is engaged by the projection 92 upon rotation of the tool 74 in a second direction. In the example shown in FIG. 5, the void 90 is partially cylindrical and the drive surface 70 is an arcuate surface that defines part of the void 90. The void 90 could be fully enclosed, other than the open entrance, by the material of the adjustment valve, or as shown in FIG. 5, the void 90 may be open to a periphery or exterior of the adjustment valve body 44.

The drive surface 70 may closely receive the projection 92 such that there is limited or no relative rotation permitted between the tool 74 and the adjustment valve 18, or the tool portion 92 may move some distance between the first portion and second portion 94, 96 of the drive surface without causing a corresponding rotation of the adjustment valve 18. In other words, the circumferential distance between the first portion and second portion 94, 96 of the drive surface 70 may be greater than the circumferential dimension of the projection 92. For example, if the tool 74 shown in FIG. 5 were used with the adjustment valve body 136 shown in FIG. 11, the projection 92, upon rotation of the tool 74 back and forth, would engage a first portion 100 of a drive surface 102 on one side of a central post 104 (which would define the support 86 in that embodiment) during rotation in one direction, and would engage a second portion 106 of the drive surface 102 on the other side of the central post 104 during rotation in the other direction. As the tool is rotated with the projection 92 located between the points of engagement (e.g. first and second portions 100, 106 of drive surface 102), the tool 74 would rotate without corresponding rotation of the adjustment valve 98. In the example of FIG. 11, the first portion and second portion 100, 106 of the drive surface 102 are part of a linear drive surface and are separated by an angle of about 160 degrees of tool rotation, although other arrangements of drive surfaces 102 may be used with angles between them of between 5 degrees and 355 degrees permitting more or less relative rotation between the tool and portions 100, 106 of the drive surface 102.

As shown in FIGS. 3 and 4, to further inhibit adjustment of the adjustment valve 18 from the factory setting, the body 44 may be wholly received within the bore 58 of the throttle valve body 12 or the cavity 59 in the insert 60 in implementations wherein an insert 60 is provided as shown. The cavity 59 may have an internal diameter and an axial depth sized to prevent readily available or common tools (such as a needle nose pliers) from engaging the drive surface(s) 70 of the adjustment valve 18, and in some implementations from engaging the valve body 44 at all. In this manner, the valve body 44 is relatively closely surrounded by the throttle valve body 12 or insert 60 which makes it difficult for anyone not having the special tool to tamper with or adjust the adjustment valve 18 from the factory set position. In at least some implementations, the drive surfaces 70 may be located within 1mm of the inner surface 108 of the insert 60 (or throttle valve body 12) that defines the cavity 59. The inner surface 108 may be at a diameter of between 2.5 mm and 4.0 mm, and the needle outer diameter may be between 1.5 mm and 2.5 mm. While the implementation shown in FIGS. 3 and 4 shows the tool projection 92 having a radial dimension that is greater than the radial dimension of the void 90 such that a portion of the projection 92 extends radially outward of the portion of the adjustment valve body 44 in which the void 90 is formed, other arrangements may be used. In at least some implementations, the radial dimension of the projection 92 may be equal to or less than the radial dimension of the void 90 such that a radially outer surface of the valve body 44 may be immediately adjacent to the inner surface 108 of the insert 60 (or throttle valve body 12 if no insert is used). As used herein, "immediately adjacent" means within 0.5 mm or less. In at least some implementations, the diameter of the cavity 59 is between 2.5 mm and 4.0 mm, and a first or outer end 110 of the adjustment valve is axially spaced at least 1 mm and may be up to 25 mm (or more in some implementations) from a first end 112 of the insert 60 that defines the open end of the cavity 59 into which the tool 74 is inserted to access the adjustment valve 18.

As shown in FIGS. 1-4 a cover 114 may be installed on the insert 60 or throttle valve body 52. The cover 114, shown separately in FIG. 7, may include an end wall 116 that overlies the first end 112 of the insert 60 and a sidewall 118 that surrounds part of the end of the insert 60. The end wall 116 may have an opening 120 that is at least partially axially aligned with the insert cavity 59, and which may be smaller in at least one dimension or direction than is the open end of the cavity 59. Thus, the cover 114 restricts the effective area through which a tool must be inserted to reach the adjustment valve 18. This further inhibits adjustment of the valve 18. The opening 120 in the cover 114 may be shaped complementary to the periphery of the working end of the tool 74 to permit the working end to be inserted through the opening 120 but prevent any tool having a periphery that won't fit through the opening 120 from being inserted into the cavity 59. In the example shown, the opening 120 in the cover 114 is generally elliptical, but it could be arranged in any shape, including a more convoluted shape like a keyhole with the tool working end being complementarily shaped similar to a skeleton key arrangement, if desired. As shown in FIGS. 1, 3 and 4, the opening 120 in the cover 114 may be eccentrically arranged relative to the axis 76 of the cavity 59 and adjustment valve 18. The opening 120 may overlie and be aligned with the support 86 and the void 90 of the adjustment valve 18 to permit the tool cavity 88 to be received over the support 86 and the tool projection 92 to be received in the void 90. The majority of the remainder of the cross-sectional area of the cavity 59 may be blocked by the cover 114 to prevent access to other portions of the adjustment valve 18 and further inhibit adjustment of the valve 18 by any tool other than the special tool designed to mate with and rotate the valve 18.

The cover 114 may be fixed to the retainer 60 or throttle valve body 52, such as by a press-fit, adhesive, weld, heat stake, connector or otherwise as desired. In the example shown, the insert 60 includes an annular groove 122 and angled tabs 124 (which may be inwardly punched portions of the sidewall 118) may be provided extending inwardly from an inner surface 126 of the cover sidewall 118. The tabs 124 are arranged to be received at least partially within the groove 122 and partially overlapping a rim 128 of the insert 60 that defines part of the groove 122. In more detail, the tabs 124 have an outer surface that is angled in the direction of assembly such that as the cover 114 is pressed onto the insert 60 the tabs 124 increasingly outwardly flex the sidewall 118 until the tabs 124 pass over the rim 128 and then the sidewall 118 can resiliently return toward its unflexed condition in which the tabs 124 are partially in the groove 122 and are radially overlapped with the rim 128. Attempts to remove the cover 114 from the insert 60 are opposed by engagement of the tabs 124 with the rim 128. Multiple tabs 124 may be provided spaced apart such that attempts to pry the cover 114 off of the insert 60 are resisted by the difficulty in simultaneously outwardly prying multiple portions of the cover sidewall 118. The tabs 124 may, if desired, freely permit rotation of the cover 114 relative to the insert 60 to facilitate aligning the opening 120 with the desired area of the adjustment valve 18 (e.g. axially overlying/aligned with the support 86 and void 90 as shown in FIG. 1).

Figure 8:
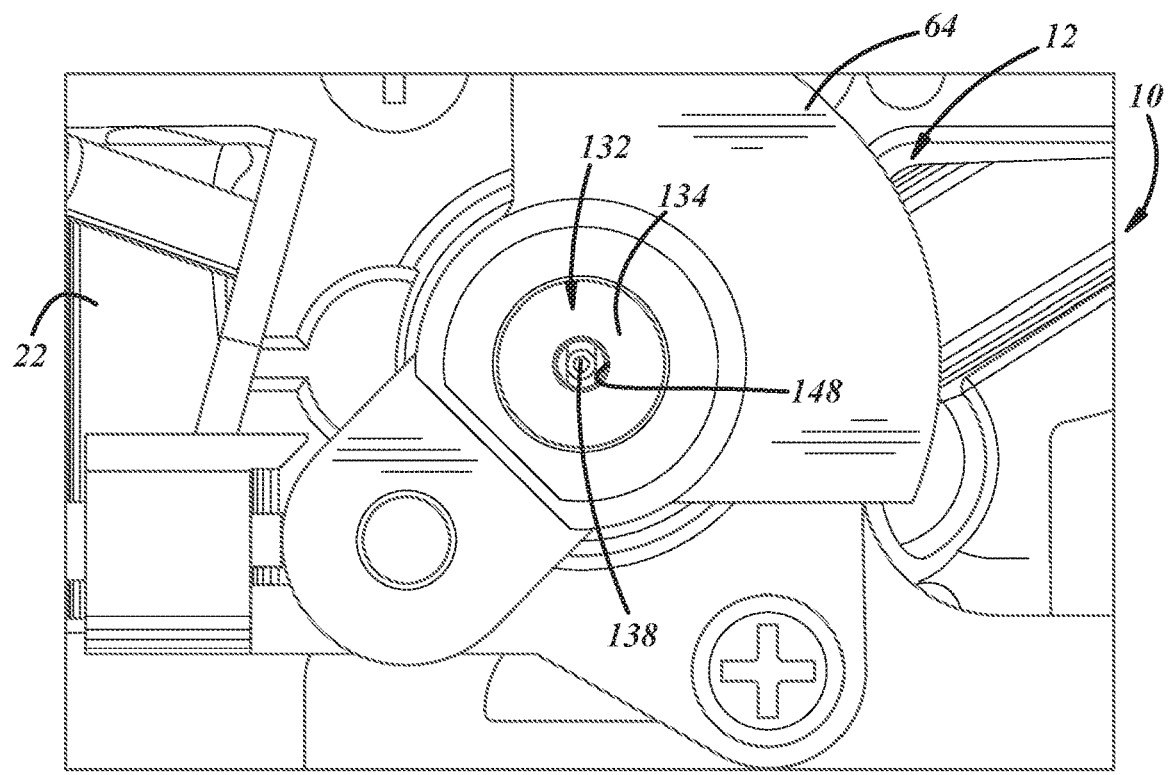
FIG. 8 is a plan view of a portion of a rotary throttle valve carburetor including an adjustment valve carried by the throttle valve.
Figure 9:
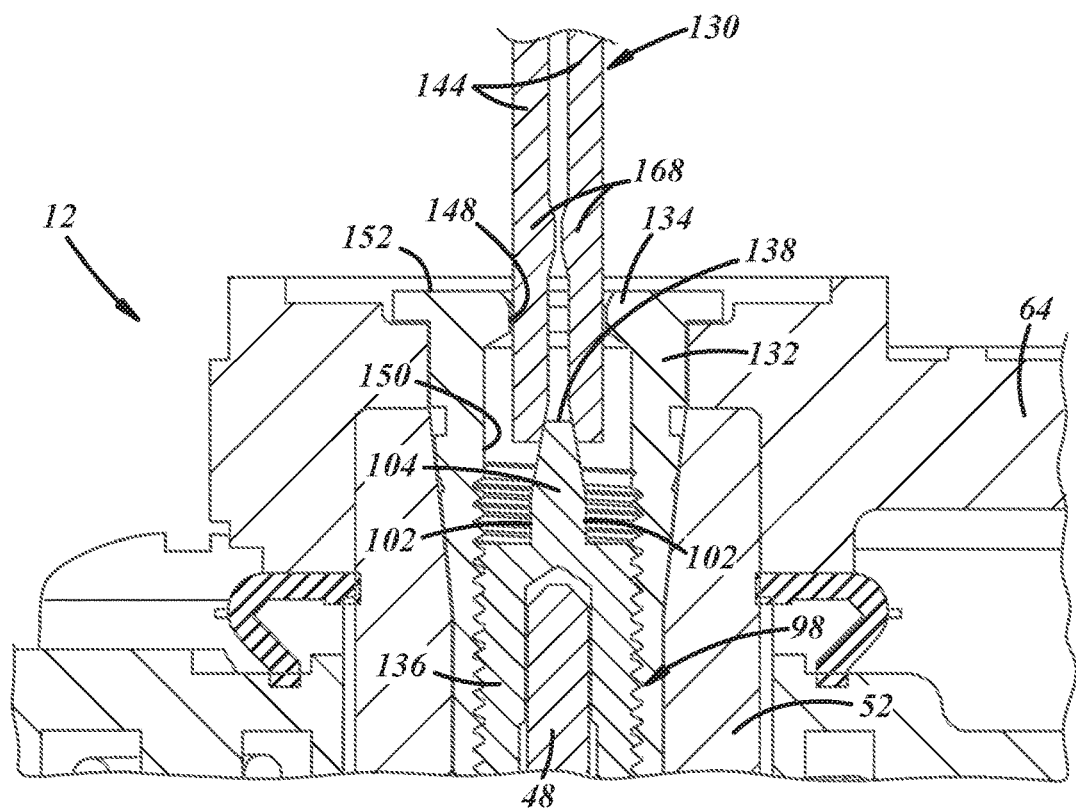
FIG. 9 is an enlarged side sectional view showing an upper portion of the throttle valve, a head of the adjustment valve and an adjustment tool in a first position initially engaging the head.
Figure 13:
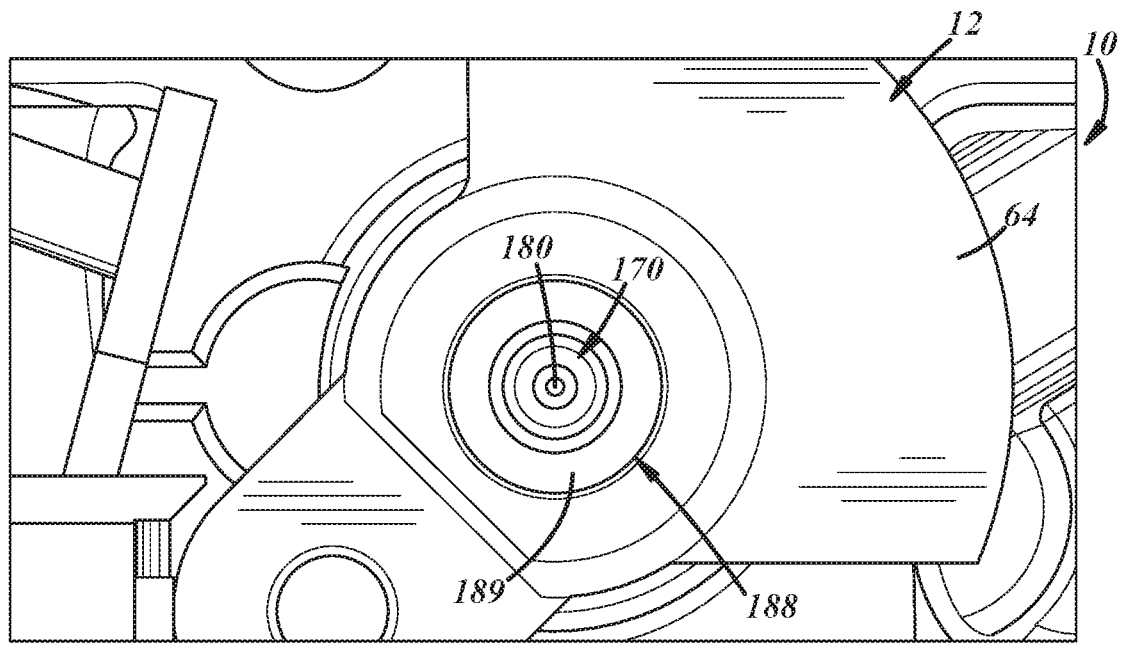
FIG. 13 is a plan view of a portion of a rotary throttle valve carburetor including an adjustment valve carried by the throttle valve.

FIGS. 8-11 illustrate another adjustment valve 98 adapted for use with a tool 130 and designed to inhibit user adjustment of the valve 98. FIGS. 9, 10 and 12 illustrate the tool 130 that may be used to rotate the adjustment valve 98. The carburetor 10 and throttle valve 12 may be as described with regard to the earlier embodiment and shown in FIGS. 1-4. To the extent the components are the same or similar as those previously described, the same reference numerals will be used hereafter and applied to FIGS. 8-11 to facilitate understanding of this implementation.

In this example, the drive surface(s) 102 of the adjustment valve 98 are arranged differently than the drive surface 70, and the insert 132 and/or a cover 134 used with the insert 132 may be different as well. In more detail, the tool engaging portions of the adjustment valve 98 include the post 104 that may be coaxial with the axis 76 and threaded portion 56 of the adjustment valve body 136. The post 104 may be cantilevered such that it has a free, first end 138 farther from the free end 42 of the needle 48 than a second end 140 that is axially spaced from the first end 138 and is coupled to the remainder of the valve body 136. The post 104 may be tapered and smaller in cross-section (taken perpendicular to the axis) at the first end 138 and larger at the second end 140. The valve body 136 may also include one or more drive surfaces 102 and each is radially inclined or at a variable radial distance along at least part of the drive surface 102. In the implementation shown, the valve body 136 includes a first drive surface 102 on one side of the post 104 and a second drive surface 102 on an opposite side of the post 104. The drive surfaces 102 are defined by linear faces of a drive portion 142 of the body 136 formed at the base of the post 104. The faces/drive surfaces 102 extend radially and axially relative to the post 104 (that is, having some radial dimension and axial dimension but not necessarily arranged along a radius or parallel to the axis) and are arranged to be engaged by a tool 130 having spaced apart fingers 144 received on opposite sides of the post 104, as shown in FIGS. 9, 10 and 12 and described in more detail below.

Each drive surface 102 may have a first portion 100 engaged by a finger 144 of the tool 130 (or the projection 92 of tool 74 as described above) when the adjustment valve 98 is rotated in a first direction and a second portion 106 engaged by a finger 144 of the tool 130 when the adjustment valve 98 is rotated in a second direction. In at least some implementations, the fingers 144 of tool 130 may engage both portions 100, 106 of one or both drive surfaces 102 in either direction of rotation, but forces will be provided between the first portions 100 in one direction of rotation and the second portions 106 in the other direction of rotation. In at least some implementations, the drive surfaces 102 are formed by flat faces of the drive portion 142, but the drive surfaces 102 could be defined by voids formed on either side of the post 104 into which the fingers 144 of the tool 130 are separately received, or by V-shaped notches, or by partially cylindrical, arcuate or other shaped faces that are engageable by a tool as the tool is rotated so that the adjustment valve 98 is also rotated during at least a portion of the rotation of the tool.

As shown in FIGS. 8-10, the insert 132 may include the cover 134 that defines or includes a restricted opening 148 to the portion of a cavity 150 in the insert 132 in which the adjustment valve 98 is received. To adjust the adjustment valve 98, a tool must be received through the restricted opening 148, which reduces the type or size of tool that may be used to adjust the valve 98. The cover 134 may be a portion of the insert 132 itself (e.g. a structure in a single piece body), or it may be a separate component that is coupled to the insert 132 like the cover 114 coupled to insert 60 described above. The restricted opening 148 is between or at a first end 152 of the insert 132 (through which the tool 130 is inserted to adjust the position of the adjustment valve 98) and the portion of the cavity 150 in which the adjustment valve 98 is received. And the restricted opening 148 is smaller than the portion of the cavity 150 in which the adjustment valve 98 is received and defines a minimum open area through which the tool must be inserted to reach the valve body 136. As shown in FIG. 10, the insert 132 may have an opposite, second end 154 that defines an opening 156 large enough to permit installation of the valve body 136 into the cavity 150, and larger than the restricted opening 148. The restricted opening 148 could also have a particular shape that corresponds to the shape of the working end of the special tool 130 to further inhibit use of a different tool to adjust the adjustment valve position. In at least some implementations, the open area in the restricted opening 148 is greater than the cross-sectional area of the post 104 at the second end 140 of the post 104 and is aligned with the post 104 to permit a tool 130 to be received over or around the post 104.

The tool 130 may include a body 158 that has two fingers 144 that are spaced apart and which may flex at least some amount independently of each other. As shown in FIG. 12, each finger 144 may be cantilevered to the body 158 and extend to a free end 160, and the fingers 144 may be formed by cutting or otherwise forming an axially extending space 162 in the body (relative to a central axis 164 of the body). Each finger 144 may be longer than the axial length of the post 104, and have a width greater than the maximum diameter of the post 104, where the width is measured along an inwardly facing surface of each finger and in a plane perpendicular to the central axis 164. One or more driving surfaces 166 are defined by at least one of the fingers 144. In at least some implementations, each finger 144 has at least one driving surface 166 adapted to engage a drive surface 102 of the adjustment valve 98 to rotate the valve as the tool 130 is rotated in at least one direction. The driving surfaces 166 may be complementary in shape to the drive surfaces 102, if desired, or may be otherwise arranged to engage the drive surfaces 102 and prevent relative rotation between the tool 130 and valve body 136 in at least one direction of rotation when the driving surface(s) 166 is/are engaged with the drive surface(s) 102. In the example shown, each finger 144 includes a portion adapted to engage the first portion 100 of one of the valve drive surfaces 102 and a portion adapted to engage the second portion 106 of one of the valve drive surfaces 102.

In an at rest condition, as shown in FIGS. 9 and 12, the fingers 144 are spaced apart by a distance less than the maximum diameter of the post 104, but sufficiently to at least partially receive the first end 138 of the post 104 between the fingers 144. The free end 160 of the fingers 144 define part of the working end of the tool 130, and in that area, the fingers 144 collectively have a surface area that is smaller than the cross-sectional area of the restricted opening 148 of the insert 132, and are shaped so that the working end of the tool 130 may pass through the restricted opening 148. When passing through the restricted opening 148, the fingers 144 may be flexed toward each other. To prevent the fingers 144 from being flexed toward each other too far, which would prevent the first end 138 of the post 104 from being received between the fingers 144, one or both fingers 144 may include a tab 168 extending inwardly from an inner surface of the fingers 144 with the tabs arranged to limit flexing of the fingers 144 toward each other. Thus, as shown in FIG. 9, when the working end of the tool 130 is passed through the restricted opening 148, the first end 138 of the post 104 is aligned with the space 162 between the free ends 160 of the fingers 144. To facilitate such alignment and receipt of the post between the fingers, the fingers may include arcuate recesses 167 (FIG. 12) which may be arranged coaxially with the tool axis 164.

Further insertion of the tool 130 into the cavity 150 causes the post 104 to be increasingly received between the fingers 144 which outwardly flexes the fingers 144 away from each other, as shown in FIG. 10. When the tool 130 is fully inserted into the cavity 150, the free ends 160 of the fingers 144 may engage the valve body 136, and/or the driving surfaces 166 of the fingers 144 axially overlap the drive surface(s) 102 of the valve body 136. In this position, rotation of the tool 130 causes rotation of the valve body 136 as the rotational force applied to the tool is applied to the drive surfaces 102 of the valve body 136 through respective driving surfaces 166 of the tool 130.

Figure 14:
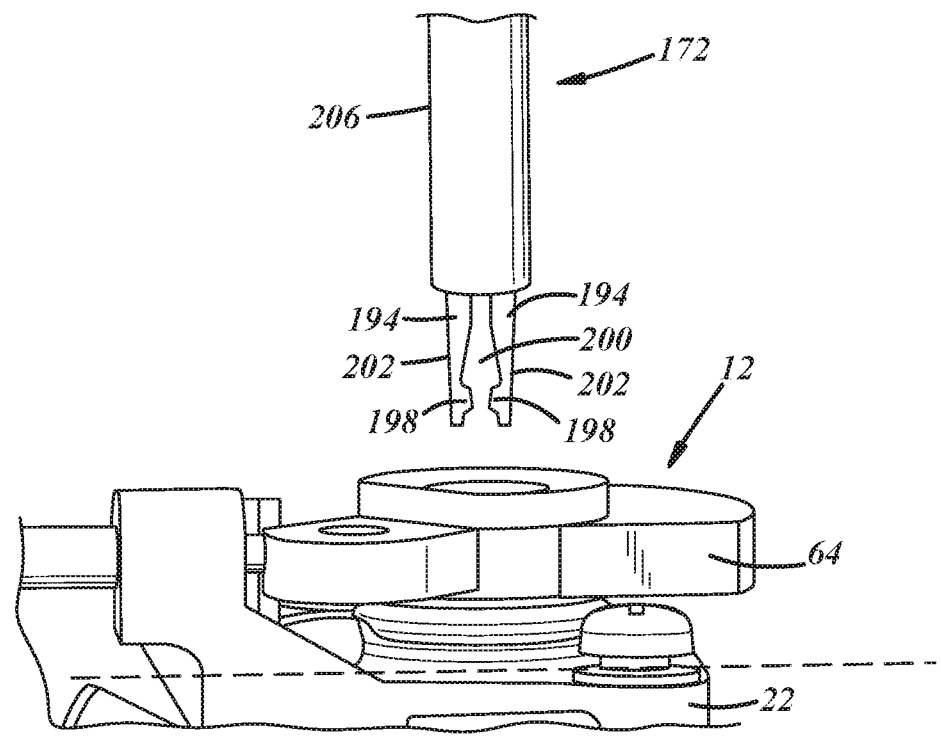
FIG. 14 is an enlarged, fragmentary side view showing a portion of the throttle valve and an adjustment tool aligned with but spaced from an adjustment valve located within the throttle valve.
Figure 15:
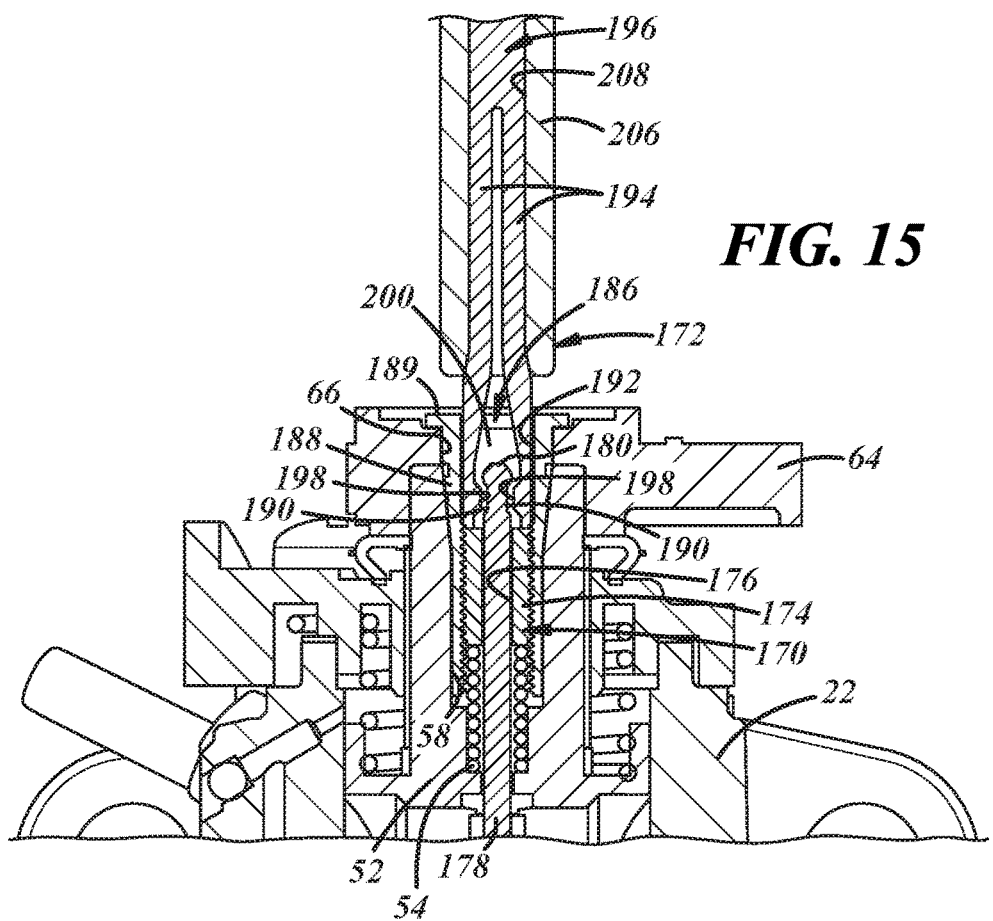
FIG. 15 is an enlarged, fragmentary sectional view showing a portion of the throttle valve and an adjustment tool in an initial position overlapped with but not engaged with the adjustment valve.
Figure 16:
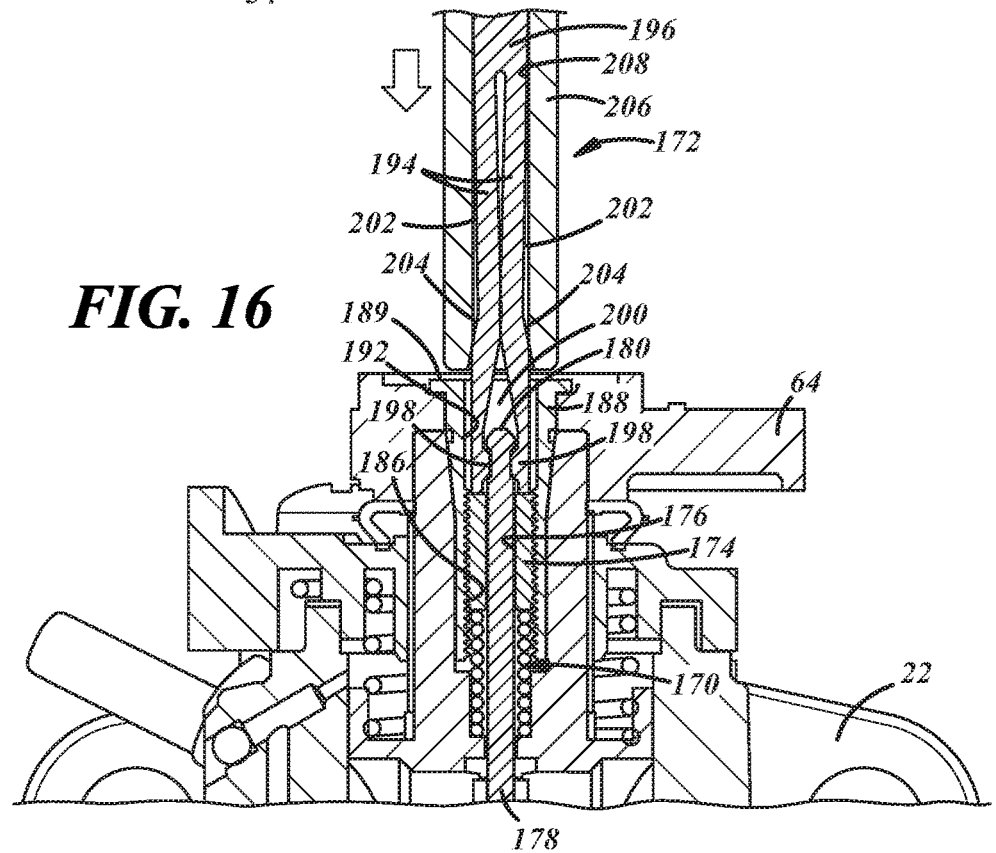
FIG. 16 is similar to FIG. 15 and shows the adjustment tool engaged with and able to drive the adjustment valve.
Figure 17:
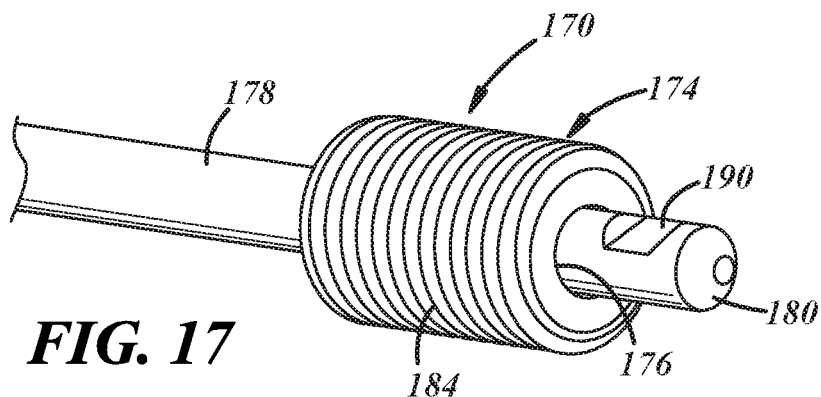
FIG. 17 is an enlarged perspective view of portion of the adjustment valve.
Figure 18:
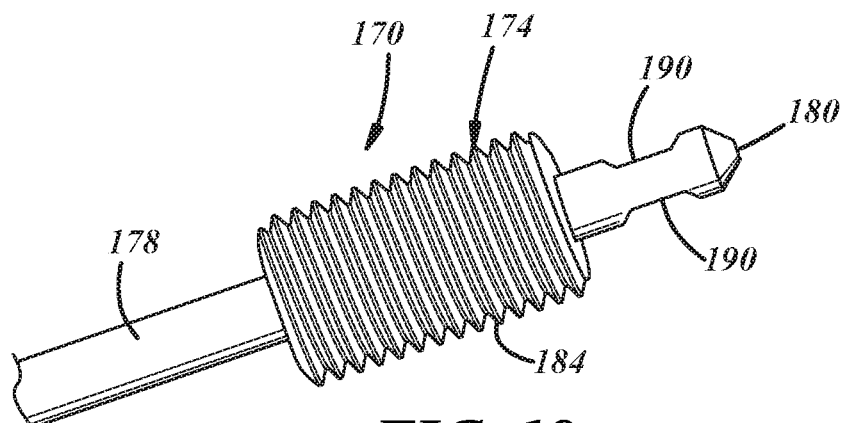
FIG. 18 is a side view of the portion of the adjustment valve shown in FIG. 17.
Figure 19:
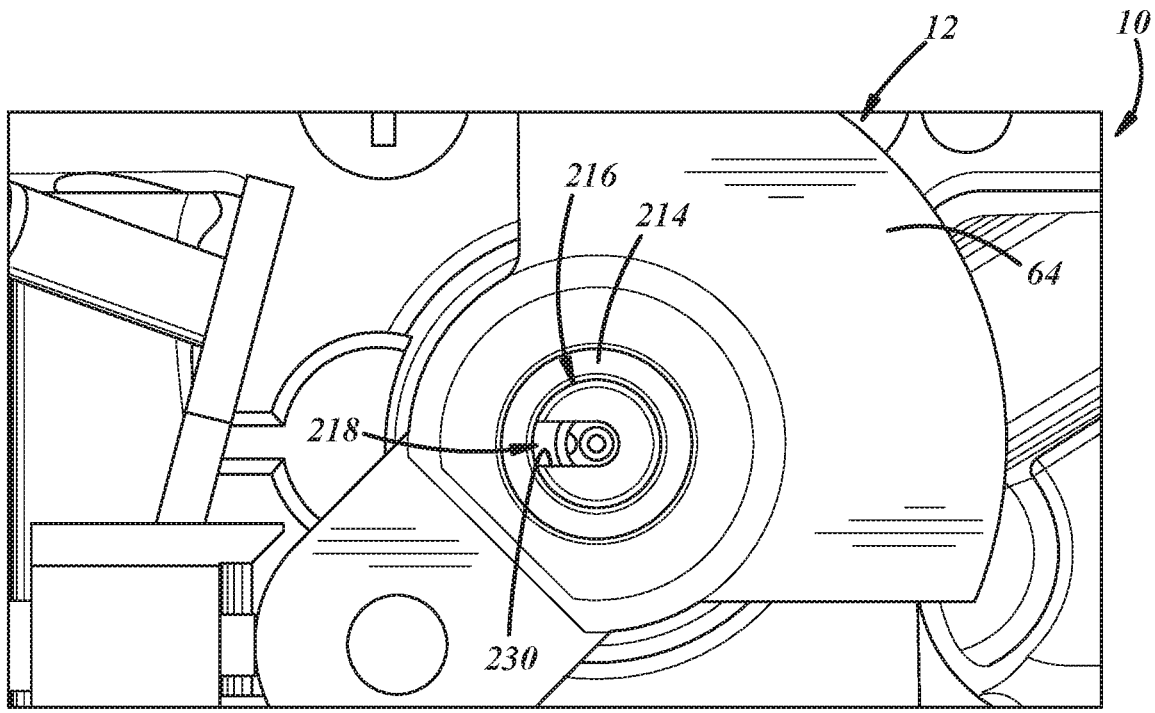
FIG. 19 is a plan view of a portion of a rotary throttle valve carburetor including an adjustment valve carried by the throttle valve.

FIGS. 13-18 illustrate another adjustment valve 170 adapted for use with a special tool and to inhibit user adjustment of the valve. FIGS. 14-16 also illustrate a special tool 172 that may be used to rotate the adjustment valve 170. The carburetor 10 and throttle valve 12 may be as described with regard to the earlier embodiment and shown in FIGS. 1-4. To the extent the components are the same or similar as those previously described, the same reference numerals will be used hereafter and applied to FIGS. 13-18 to facilitate understanding of this implementation.

In at least some implementations, the adjustment valve body 174 is tubular and has an inner hole 176 into or through which the needle 178 extends so that opposed first and second ends 180, 182 (182 is not shown, but see FIG. 3 for an end of a needle that is received within the fuel nozzle 36) of the needle 178 are exposed on opposite sides of the valve body 174. As in previously described implementations, the valve body 174 includes a threaded exterior portion 184 that is received within the threaded portion of the cavity 186 in the insert 188. The insert 188 may or may not have a restricted opening 148 as described above, and is shown in FIGS. 13, 15 and 16 as having a generally constant inner diameter without any restricted portion. The insert 188 may be pressed into or otherwise fixed to the throttle valve body 52 and may have an upper or first end 189 that may extend axially out of the throttle valve lever 64, be flush with the corresponding end of the throttle valve lever 64, or be recessed into the corresponding end of the throttle valve lever 64 or throttle valve body 52.

The first end 180 of the needle 178 may include one or more drive surfaces 190 arranged to be engaged and driven by a tool 172 to rotate the adjustment valve 170. In at least some implementations, the drive surfaces 190 are axially spaced from the first end 180 of the needle 178 and may be defined by cutouts or voids formed in the needle 178 axially spaced from the first end 180. The cutouts or voids may define flat faces or otherwise be formed for engagement by a tool 172 to permit rotation of the adjustment valve 170 by the tool 172. Clearance is provided between the first end 180 of the needle 178 and the inner surface 192 of the insert cavity 186 so that the working end of the tool 172 may be received between them.

The tool 172 that may be used to rotate the adjustment valve 170 is shown in FIGS. 14-16 and includes spaced apart fingers 194 carried by a body 196. Each finger 194 may include a projection 198 that extends inwardly from an inner surface of the finger 194 and the tool 172 may include, axially spaced from the projections 198, a space 200 large enough to receive the first end 180 of the needle 178. An inner surface of each projection 198 may define a driving surface adapted to engage a drive surface 190 of the adjustment valve 170, as will be described further below. The space 200 between the projections 198 of the fingers 194 may be greater in width than the width (or corresponding dimension) of the first end 180 of the needle 178 so that the fingers 194 can be received on opposite sides of the needle 178 when inserted into the cavity 186. Alternatively, the projections 198 may engage the first end 180 of the needle 178 and be spread apart by the first end of the needle as the tool 172 is inserted into the cavity 186, similarly to the tool 130 described above. The fingers 194 may include a radially outer surface 202 that includes a radially outwardly tapered or inclined portion 204. The tool 172 may include a sleeve 206 that surrounds at least a portion of the body 196 and which is axially slidable along the body 196. The sleeve 206 has an inner diameter or passage 208 that is smaller than the fingers 194 in the area of the inclined portion 204, at least in an at rest, unflexed condition of the fingers 194. In a retracted position, the sleeve 206 is axially spaced from the inclined portion 204 and in an advanced position, the sleeve 206 overlies at least part of the inclined portion 204 and thereby flexes the fingers 194 inwardly, toward each other.

To adjust the position of the adjustment valve 170, the working end of the tool 172 is inserted into the cavity 186 until the free ends of the fingers 194 are received on opposite sides of the first end 180 of the needle 178, as shown in FIG. 15. In this position, the projections 198 are axially aligned with and located radially outboard of the drive surfaces 190 of the valve 170 (which in this implementation are defined by the needle 178, not the valve body 174). The sleeve 206 is then moved from the retracted position, shown in FIG. 15, to the advanced position, shown in FIG. 16. This flexes the fingers 194 toward each other and engages the driving surfaces of the projections 198 with the drive surfaces 190 of the needle 178, clamping the needle 178 between the projections 198. Then, rotation of the tool 172 causes rotation of the adjustment valve 170. To remove the tool 172, the sleeve 206 is returned to the retracted position and the fingers 194 resiliently flex back to or toward their unflexed condition so that the projections 198 are fully or sufficiently clear of the first end 180 of the needle 178 and the tool 172 can be removed from the cavity 186. In at least some implementations, to avoid forceful contact with the needle 178 which could affect the adjusted position of the adjustment valve 170, the unflexed or at rest condition of the fingers 194 provides radial clearance between the fingers 194 and the needle 178 so that the working end of the tool 172 can be removed from the cavity 186 with minimal or no contact with the needle 178. The tool 130 shown in FIG. 12 could alternatively be used with the needle 178, and/or the sleeve 206 could be used with the tool 130 shown in FIG. 12.

Figure 20:
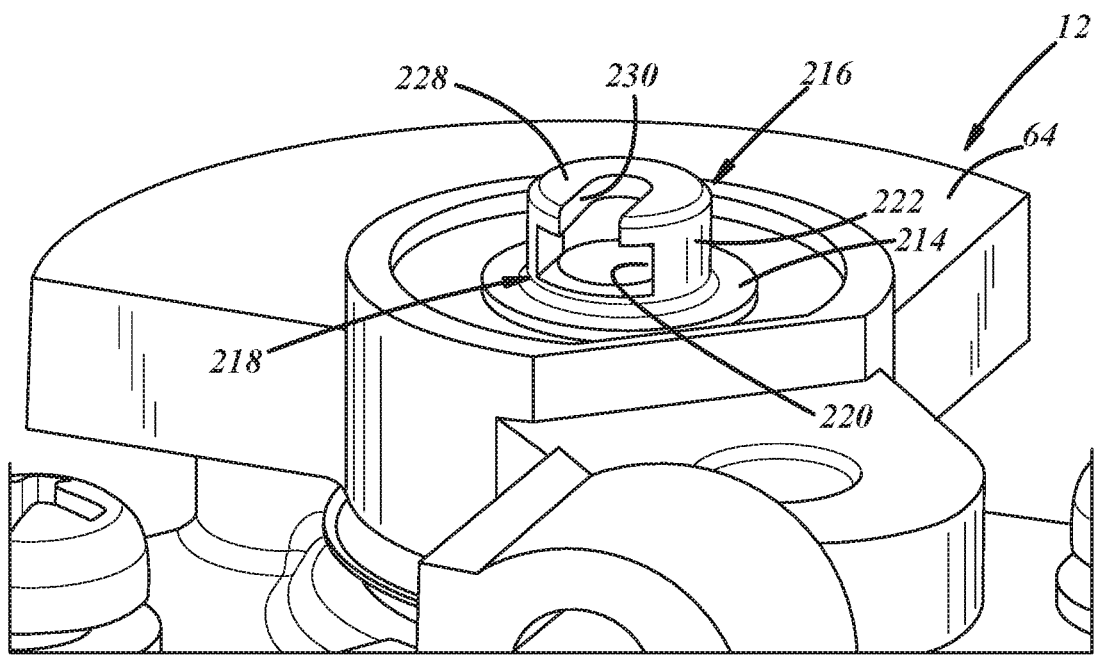
FIG. 20 is an enlarged, fragmentary perspective view showing a portion of the throttle valve including a cover carried by the throttle valve and having an inlet for an adjustment tool.
Figure 21:
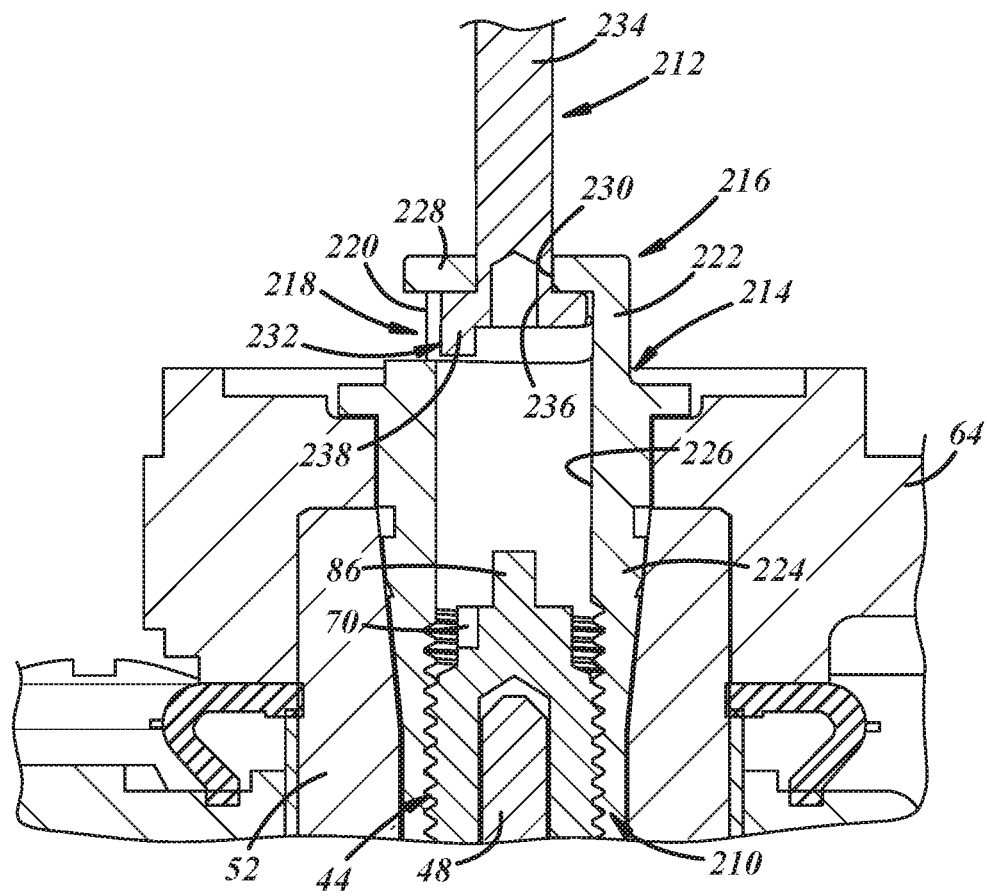
FIG. 21 is an enlarged, fragmentary sectional view showing a portion of the throttle valve and an adjustment tool received within the inlet and aligned with but spaced from an adjustment valve located within the throttle valve.
Figure 22:
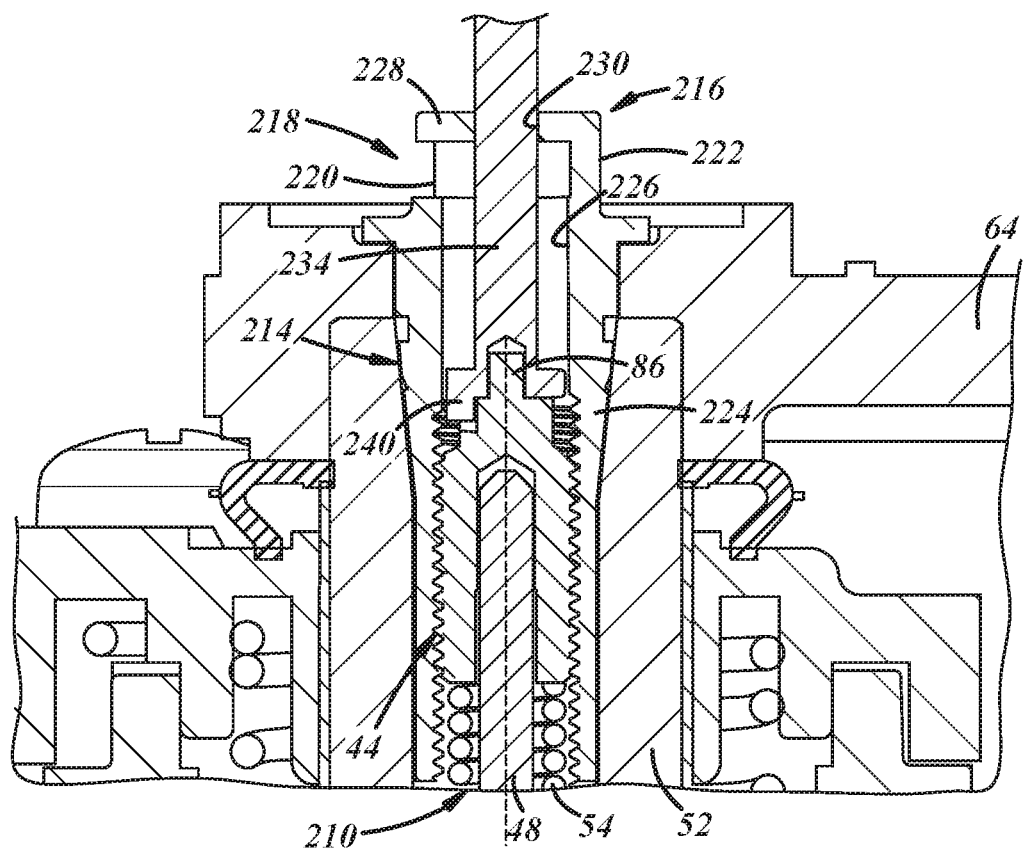
FIG. 22 is similar to FIG. 21 and shows the adjustment tool engaged with and able to drive the adjustment valve.
Figure 23:
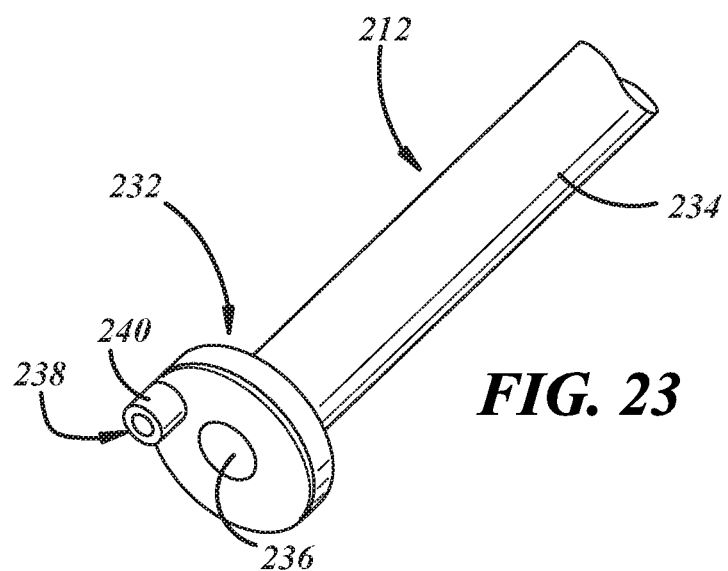
FIG. 23 is a perspective view of an end of the adjustment tool.
Figure 24:
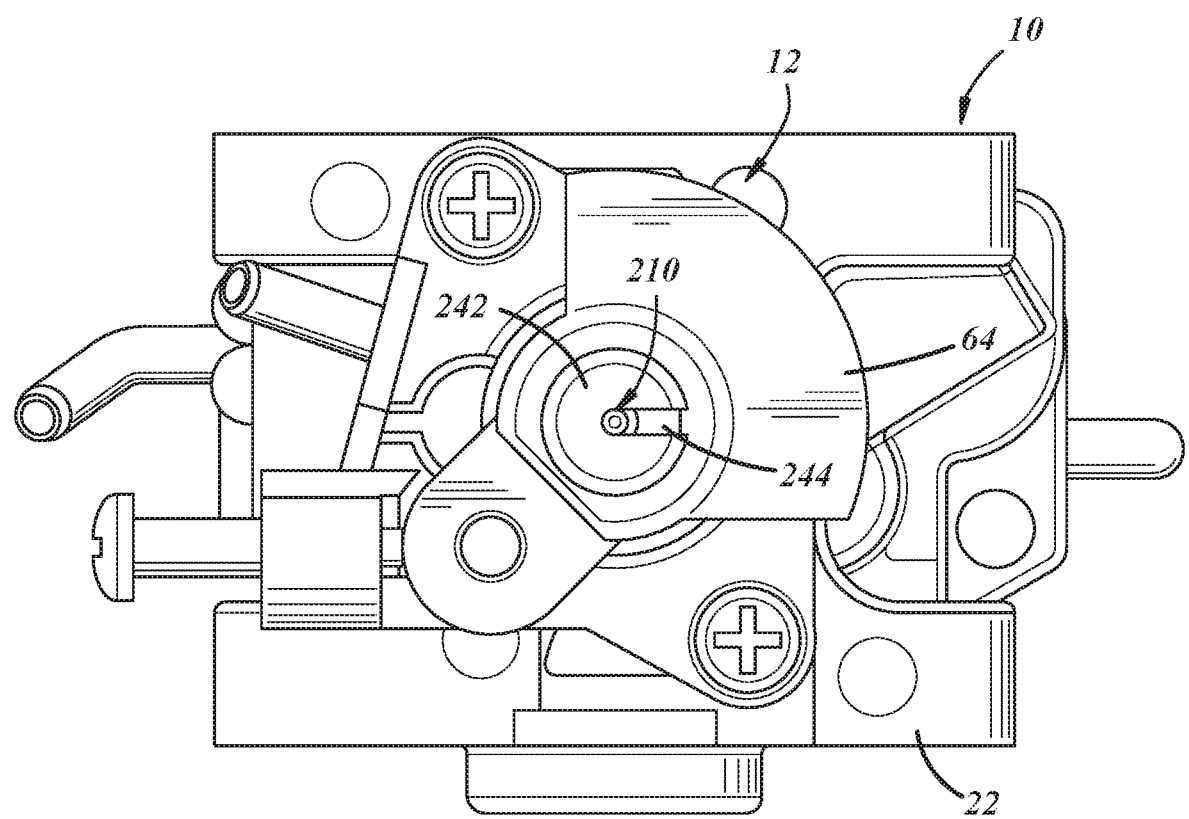
FIG. 24 is a plan view of a portion of a rotary throttle valve carburetor including an adjustment valve carried by the throttle valve.
Figure 25:
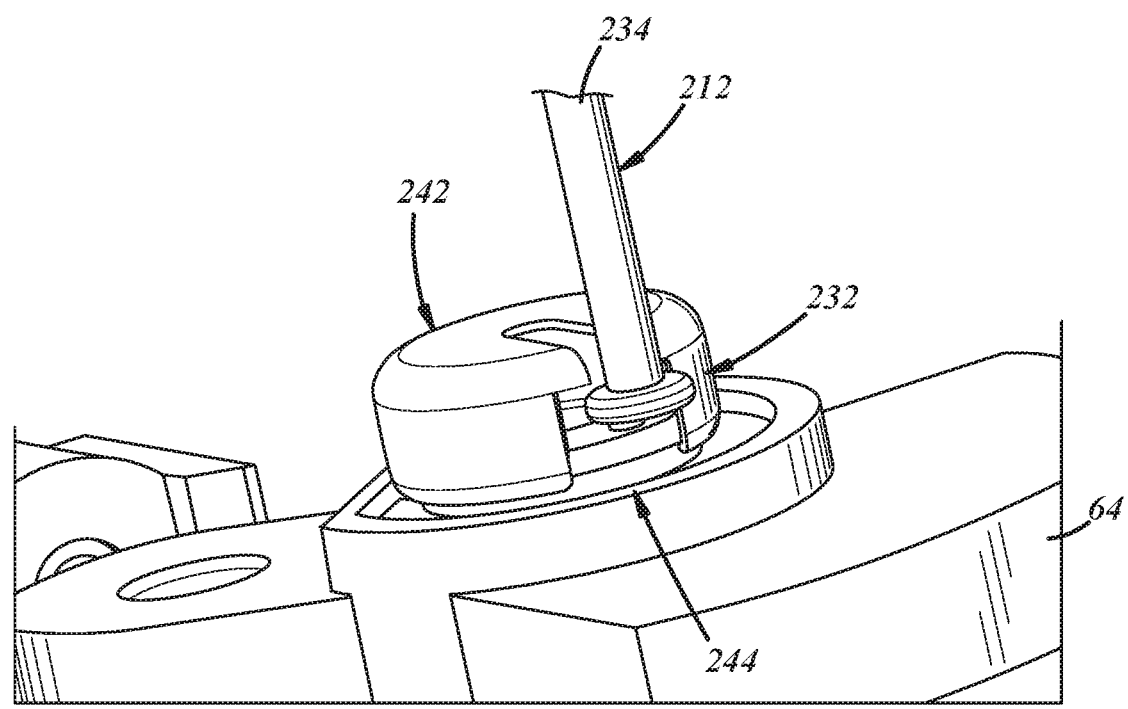
FIG. 25 is an enlarged, fragmentary perspective view showing a portion of the throttle valve including an insert carried by the throttle valve and having an inlet for an adjustment tool, and a cover received at least partially over the insert and including an inlet aligned with the insert inlet.
Figure 26:
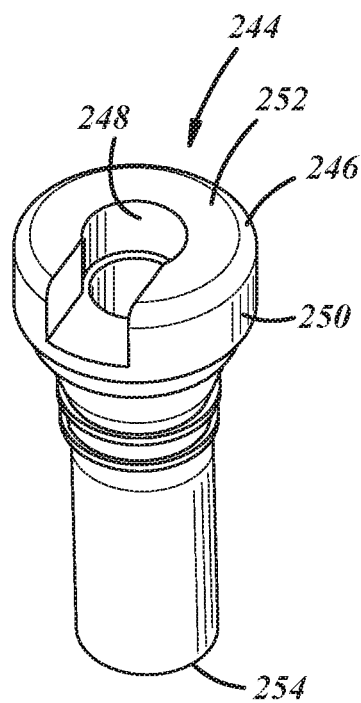
FIG. 26 is a perspective view of the insert.
Figure 27:
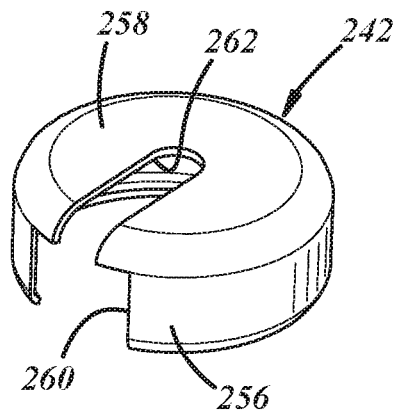
FIG. 27 is a perspective view of the cover.
Figure 28:
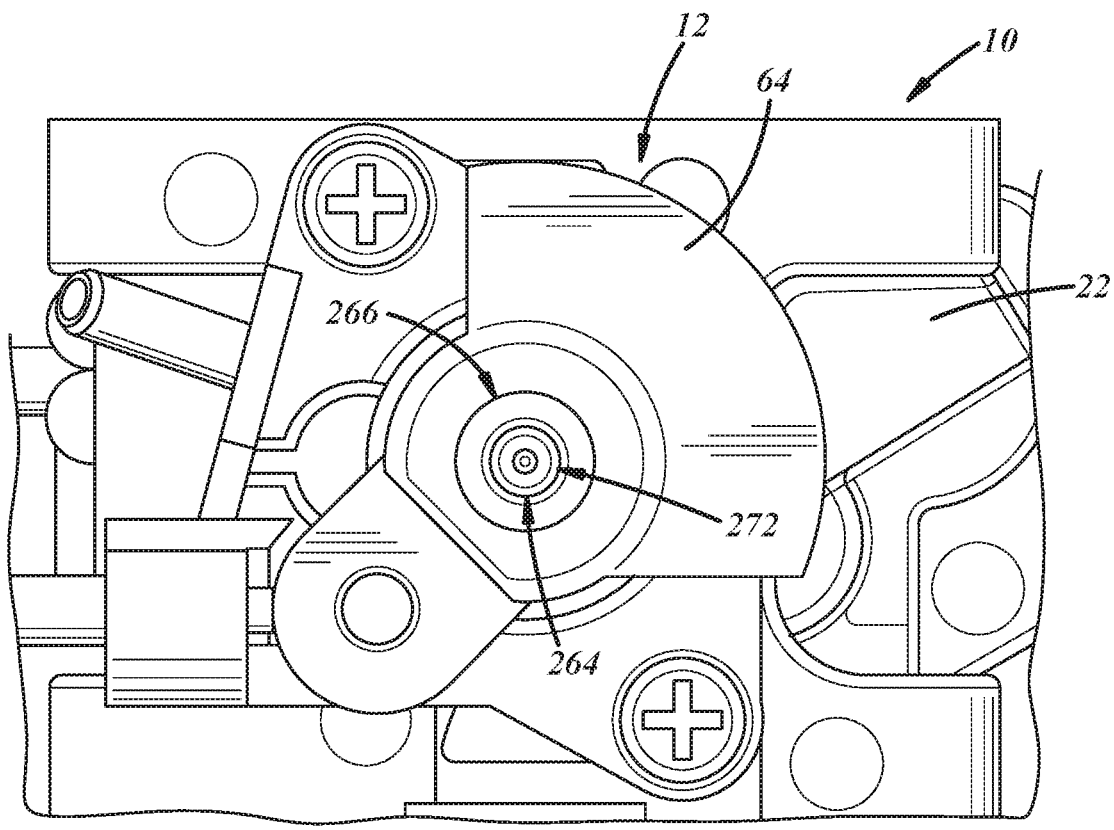
FIG. 28 is a plan view of a portion of a rotary throttle valve carburetor including an adjustment valve carried by the throttle valve.

FIGS. 19-23 illustrate an adjustment valve 210 adapted for use with a special tool and to inhibit user adjustment of the valve. FIGS. 21-23 illustrate a special tool 212 that may be used to rotate the adjustment valve 210. The carburetor 10 and throttle valve 12 may be as described with regard to the earlier embodiment and shown in FIGS. 1-4. To the extent the components are the same or similar as those previously described, the same reference numerals will be used hereafter and applied to FIGS. 19-23 to facilitate understanding of this implementation.

In this implementation, the adjustment valve 210 and the tool 212 may be as described with reference to FIGS. 1-5, so the same reference numerals will be used to describe various features of the valve 210. The adjustment valve 210 may be received within an insert 214 that may include a cover 216 defining a restricted opening 218 through which the tool 212 must be inserted to reach the adjustment valve 210. This limits the type or shape of tool that may be used to adjust the position of the adjustment valve 210. In at least some implementations, the cover 216 is part of the insert 214 and may be formed in the same piece of material as the remainder of the insert (as shown in FIGS. 20-22) or which may be formed separately and coupled or fixed to the insert 214.

The cover 216 may extend outwardly from the throttle valve lever 64, or may be flush therewith or recessed therein. If recessed or flush, the throttle valve lever 64 may include a cavity that provides clearance between the lever 64 and the cover 216, particularly in the area of an inlet 220 that defines part of the restricted opening 218. The cover 216 may include an axially extending annular sidewall 222 that extends from a main body 224 of the insert 214 that includes the cavity 226 in which the adjustment valve 210 is received (e.g. by mating threads as described above). The sidewall 222 is coupled to an end wall 228 that overlies and blocks at least part of the cavity 226 in the insert 214. The restricted opening 218 may be formed at least partially in the sidewall 222 and the end wall 228. For example, the inlet 220 of the restricted opening 218 may be formed radially through the sidewall 222 and be connected to a slot 230 formed through the end wall 228, with the inlet 220 and slot 230 defining portions of the restricted opening 218. The width of the slot 230 may be less than the width of the inlet 220, and may be between 20% and 80% of the width of the inlet 220, and thus, a larger portion of a tool 212 may be inserted through the inlet 220 but not through the slot 230. In this way, a tool 212 having a larger working end 232 (labeled in FIGS. 21 and 23) coupled to a narrower or smaller shank 234 may be aligned with the cover 216 so that the working end 232 is moved radially through the inlet 220 with the shank 234 moving in the slot 230. The tool 212 shown in FIG. 23 is similar to the tool 74 shown in FIG. 5 (and may be the same as the tool 74) in that the tool 212 includes a central cavity 236 to receive the support 86 and an eccentric projection 238 having one or more driving surfaces 240 to engage the drive surfaces 70 of the adjustment valve 210. The working end 232 of tool 212 includes the cavity 236 and the projection 238, and is radially larger than the shank 234, and the inlet 220 may be sized to receive that portion of the tool 212, but that portion of the tool 212 will not fit through the slot 230 in the end wall 228. Thus, the tool can only be received through the restricted opening 218 in a particular way, and cannot simply be axially advanced into the cavity 226. Instead, the working end 232 of the tool 212 must be positioned axially aligned and radially outboard of the inlet 220 and then radially moved through the inlet. During this movement, the shank 234 is aligned with and moves within the slot 230 in the end wall 228.

After sufficient radial movement of the tool 212, when the working end 232 of the tool 212 is aligned with the cavity 226, the tool 212 can be moved axially toward the adjustment valve 210 until the support 86 is received in the tool cavity 236 and the projection 238 is received in the adjustment valve void 90 or otherwise adjacent to and axially overlapped with the drive surfaces 70. Thus, the tool 212 must be moved in two directions in order to be received within the cavity 226, and must have a shank 234 that can fit in the slot 230 and a working end 232 that can fit in the inlet opening 220 when the shank is in the slot. With drive surfaces 70 radially spaced from the axis 76 and axially spaced from the support 86, a thin blade like a flat-head screwdriver cannot be used to adjust the adjustment valve 210. Even if the screwdriver head could fit through the slot 230 in the cover 216, the slot 230 is preferably aligned with the support 86 so that a tool head inserted through the slot 230 would engage the support 86 and could not drivingly engage the round support 86. Further, the relatively narrow slot 230 would prevent the screwdriver head from engaging the drive surface(s) 70 radially spaced from the axis.

FIGS. 24-27 illustrate an arrangement similar to that described above with reference to FIGS. 19-22, and the same adjustment valve 210 and tool 212 may be used. Thus, primarily only the differences in this implementation compared to that just described will be set forth below. In this example, the cover 242 is formed separately from the insert 244 which enables the insert 244 to be of simpler and less expensive construction. As shown, the insert 244 includes a head 246 that is accessible from the exterior of the carburetor 10 and which includes a void 248 (e.g. a slot) extending from the radially outer surface 250 of the head 246 to the cavity 262 in the insert 244. The void 248 may be open through the first axial end 252 of the insert 244 and may, if desired, have a continuous width which may be the same as or greater than the diameter of the cavity 226. If desired, the width of the void 248 could be smaller than the width of the cavity 226 and the adjustment valve 210 would then be inserted through the other, or second end 254 of the insert 244 during assembly.

The cover 242 is attached to the insert 244 and includes a sidewall 256 that surrounds at least part of the radially outer surface 250 of the head 246 and an end wall 258 coupled to the sidewall 256. The sidewall 256 includes an inlet 260 that is aligned with the peripheral end of the void 248 in the head 246, and a slot 262 is formed in the end wall 258 and is open to the inlet 260 to define a restricted opening in similar manner to the inlet 220 and slot 230 described with reference to the insert 214. The inlet 260 may be the same size, larger than or smaller than the peripheral end (e.g. radially outermost part) of the void 248 with which it is aligned. Thus, the maximum open area of the inlet 260 to the cavity 226 may be defined by either or both of the inlet 260 in the cover 242 and the void 248 in the head 246. The slot 262 may be constructed and arranged, and have a size and orientation and alignment as set forth above with regard to the slot 230 in the insert 214.

Thus, a tool 212 may be inserted radially through the inlet 260 and then the tool moved axially into the cavity 226 in the same manner as set forth above, with the shank 234 of the tool 212 received in the slot 260 of the cover 242. However, the insert 244 need not have the end wall 228 integrally formed therein so the insert 244 may be simpler and less expensive to form. Further, the cover 242 may be a simple cup-shaped member and the inlet 260 and slot 262 may be readily formed therein. And different covers, having differently shaped or sized inlets 260 and slots 262 may be used with different inserts to further customize the type or shape of tool that may be used to adjust the position of an adjustment valve 210 carried by the insert 244.

Figure 29:
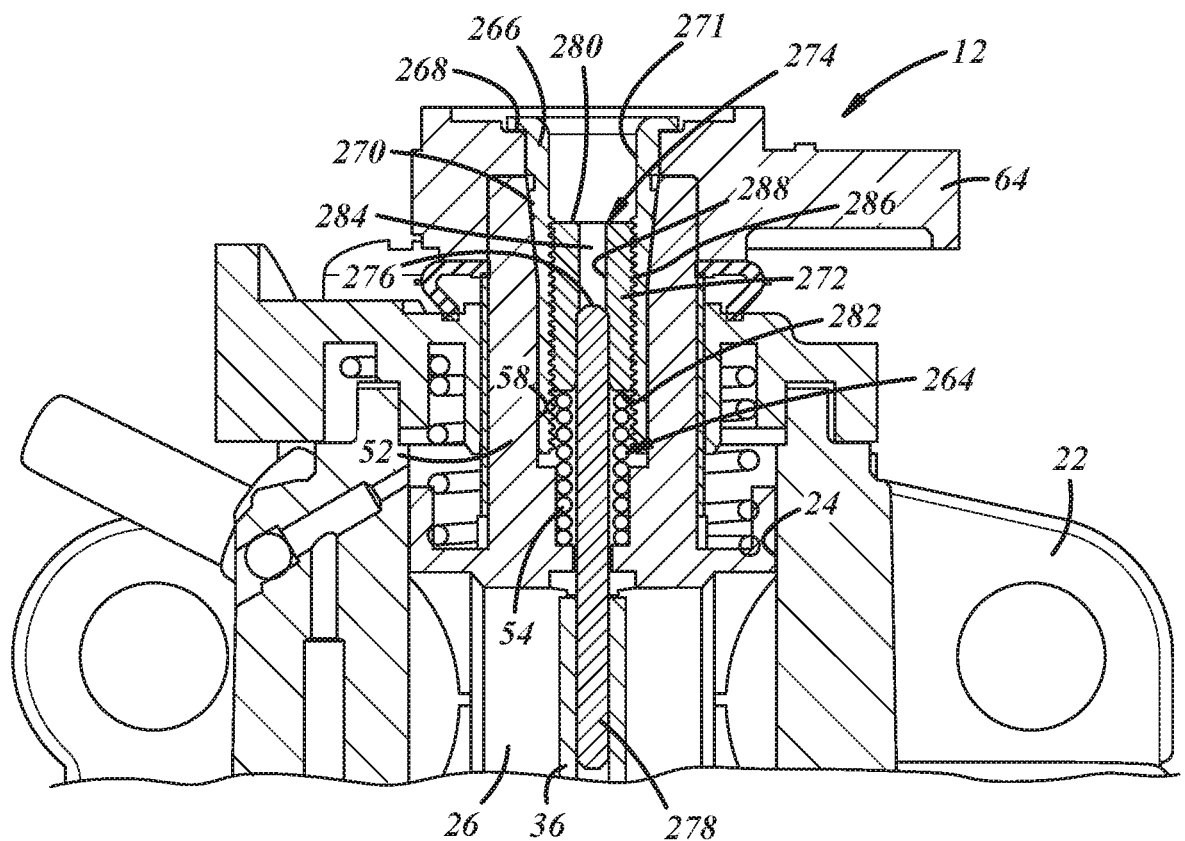
FIG. 29 is an enlarged fragmentary sectional view showing an upper portion of the throttle valve and an adjustment valve carried by the throttle valve.
Figure 30:
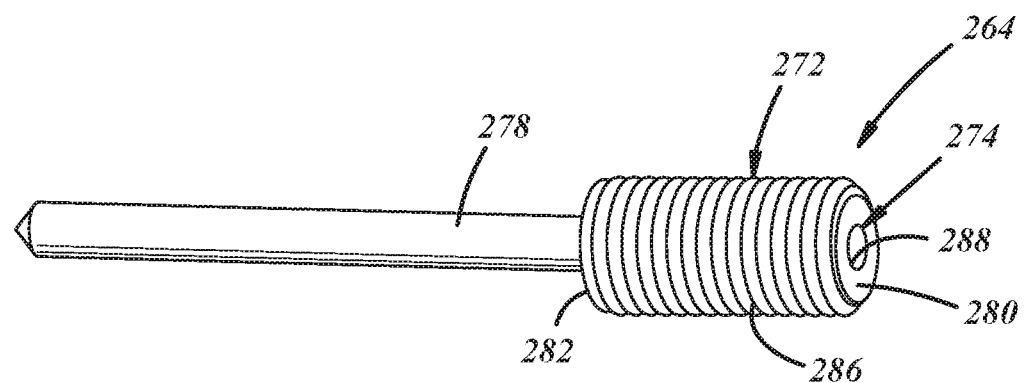
FIG. 30 is a perspective view of the adjustment valve.

FIGS. 28-33 illustrate an arrangement of throttle valve 12 having an adjustment valve 264 received within an insert 266. As shown in FIG. 29, the insert 266 may be like the insert 188 set forth in FIGS. 13-16, and may have an outwardly extending flange 268 engaged with the throttle lever 64 to limit insertion of the insert 266 into the bore 58 of the throttle valve body 52, and with outwardly extending barbs 270 engaged with the throttle valve body 52 to retain the position of the insert 266 with respect to the throttle valve body 52. The inner surface 271 of the insert 266 may be generally cylindrical and include a threaded portion mated with threads on the adjustment valve body 272.

The adjustment valve body 272 may be a hollow cylinder with a bore 274 in which a first end 276 of the needle 278 is press-fit or otherwise fixed to inhibit or prevent relative movement between the adjustment valve body 272 and the needle 278. The first end 276 of the needle 278 may be received between opposed first and second ends 280, 282 of the adjustment valve body 272, with a space 284 provided between the first end 276 of the needle 278 and first end 280 of the adjustment valve body 272. The space 284 is open to and/or accessible from the exterior of the carburetor 10. That is, a tool inserted into the open end of the insert 266 can reach the first end 280 of the adjustment valve body 272 and the open space 284. The outer surface 286 of the adjustment valve body 272 may be closely received in the insert bore, with little or no space provided radially between the insert 266 and adjustment valve body 272.

In at least some implementations, the first end 280 of the adjustment valve body 272 is generally planar, and perpendicular to the axis 76, and the bore 274 at the first end 280 of the adjustment valve body 272 is circular in cross-section. That is, the bore 274 has a constant radial dimension about its circumference, at least in the area of the first end 280 of the adjustment valve body 272. In at least some implementations, the bore diameter is less than 1.25 mm, and may be between 0.6 mm and 1 mm in at least some implementations. Similarly, the adjustment valve body 272 may have an outer diameter of less than 4 mm, and may be between 2.5 mm and 3 mm. The needle 278 may have a diameter between 1 mm and 1.25 mm, or otherwise as desired. The inner surface 288 of the adjustment valve body 272, which defines the bore 274, may be relatively smooth. As shown in FIGS. 31-33, the bore 274 from the first end 280 of the adjustment valve body 272 to the first end 276 of the needle 278, may have a uniform diameter (FIG. 31), or have a diameter that varies along its axial length such as by narrowing from the first end 280 of the adjustment valve body 272' (FIG. 32) or becoming larger from the first end 280 of the adjustment valve body 272" (FIG. 33). While truncated cone shaped bores are shown in FIGS. 32 and 33, other shapes may be used, including but not limited to partial spheres, or stepped changes in diameter.

The adjustment valve body 272 may be formed of a relatively soft material. Representative materials include brass, cold rolled steel, Aluminum, Zinc. The relatively soft material of the adjustment valve body 272 may permit a small working end of a tool having a barb, tooth, outwardly oriented point or thin edge, or a rough surface to frictionally engage the inner surface of the adjustment valve body, and may cut into or deform the inner surface or by sufficient frictional interference enable rotation of the adjustment valve body by rotation of the tool.

Thus, the adjustment valve drive surface in this embodiment is defined by portion of the bore 274 that may circular or cylindrical, at least in the as-formed condition, and which may be coaxial with the axis of rotation 76 of the adjustment valve 264. The drive surface may, in at least some implementations, be deformed, scratched or cut after insertion of a tool for driving rotational engagement of the tool with the adjustment valve 264. The relatively small opening of the bore 274 at the first end 280 prevents normal or common tools like screwdrivers or socket drivers from being used to adjust the position of the adjustment valve 264. A special tool having a working end small enough to fit in the bore 274 and having a driving surface suitable to engage and drive the adjustment valve body 272, can be used and end users of the carburetor (e.g. people who buy a power tool that includes the carburetor) typically do not have such a tool and are thus unable to adjust the position of the adjustment valve. If desired, the insert cavity in which the adjustment valve 264 is received may have a restricted opening or restricted portion and/or a cover may be provided to limit access to the adjustment valve body 272 in the insert 266. This may inhibit or prevent, for example, someone from drilling holes in the first end 280 of the adjustment valve 272 body offset from the axis 76, or otherwise deforming the first end 280 of the adjustment valve body 272, and using the drilled holes or deformation(s) as drive surfaces to rotate the adjustment valve 264.

As shown in FIG. 34, in addition to being carried by the throttle valve 12, an adjustment valve 18' may be carried by a body 20 of the carburetor 14, such as a main body that defines the fuel and air mixture passage 28. The adjustment valve 18' may limit the maximum fuel flow rate in a fuel passage 34 or fuel circuit of the carburetor 10 or 14 to regulate high speed engine operation. To control the maximum fuel flow rate through the fuel passage 34 and hence, to a main fuel jet (not shown) in a butterfly throttle valve carburetor, the adjustment valve 18' may be carried by the carburetor body 20 in communication with the fuel passage 34. The adjustment valve 18' preferably includes a threaded shank portion 290 received in a threaded bore 292 of the carburetor body 20 to permit axial adjustment of the position of a tip 294 of the adjustment valve 18' relative to the fuel passage 34. In this implementation, the tip 294 provides a restriction to fuel flow through the fuel passage 34, such as through an orifice surrounding the tip, and thereby limits the maximum fuel flow rate through the fuel passage 34. The adjustment valve 18' may be formed in the same manner as the adjustment valves described above. Further, an insert may be provided in the carburetor body 20 and the insert may be constructed as described above in combination with a suitable adjustment valve and/or the carburetor body may be formed to include the features of the inserts set forth above (e.g. the cover and/or inlet and/or slot as appropriate for a given implementation). A similar arrangement may be used to control fuel flow through the fuel passage 34 leading to the fuel nozzle 36 as shown in FIG. 3, for a rotary throttle valve carburetor (that is, the adjustment valve 18' may be carried by the carburetor body 22 so that the tip 294 is movable relative to the fuel passage 34 to limit the maximum fuel flow rate through the passage 34).

Different implementations of adjustment valves and/or inserts and/or tools will be apparent to people of ordinary skill in this art upon review of the above disclosure and accompanying drawings. For example, while the adjustment valve 18 shown in FIGS. 1-5 includes a support 86 that projects axially from the valve body 44 and is axially spaced from the drive surfaces 70, the adjustment valve could instead include a support 86 that is a cavity which receives a coaxial projection of the tool. Of course, the drive surface 70 could instead be defined by a projection. That is, the support and drive surface could be defined by projections or voids or any combination of the two. Further, while at least some of the adjustment valves described have two engaging portions (e.g. drive surface 70 and support 86, two drive surfaces 102 of valve body 136, two drive surfaces 190 of needle 178, the adjustment valve 264 can be formed with only one engaging portion, the inner surface 288 of the valve body 272. And while some of the adjustment valves include drive surfaces that have radially varied surfaces (e.g. portions at different radial distances from the axis 76), the adjustment valve 264 may have the bore 274 formed coaxial with the axis 76 and hence, the inner surface 288 may be coaxial with the axis 76.

Further, while the adjustment valves 18 and 210 are shown as having one tool engaging portion coaxial with the axis of rotation 76, the valves 18 and 210 could instead include two radially spaced apart drive surfaces with neither drive surface provided on the axis 76. In one form, the valves 18, 210 could have two voids both radially spaced from the axis 76 and each arranged to receive a separate projection 92, 238 of a tool. Adjustment of such an arrangement can be inhibited by use of a cover having a restricted opening, as shown for example, in FIGS. 19-22, 24, 25 and 27, or a cover wherein an opening through the cover exposes or is circumferentially aligned with and axially overlies only one of the voids, with the other void overlapped by the cover and essentially blind or hidden to a person doing the adjustment. Upon radial movement of the tool in the restricted opening, both projections would be aligned with their respective voids, but adjustment of the valve with a different tool not including the projections fixed to a central shank, would be difficult or impossible. The voids could be arranged in any desired manner, with diametrically or radially opposed voids being preferred in at least some implementations. Still further, with a slot (e.g. slot 230) in an end wall of a cover, or other guide for a shank of a tool, only one tool engaging portion may be needed on the adjustment valve. That is, the end of the slot could be arranged so that, when the end of the slot is engaged by the shank, the shank is generally coaxial with the adjustment valve and the cover may then guide or support rotation of the tool. That is, the slot may extend radially a sufficient distance so that the end spaced from the sidewall of the cover extends beyond the axis 76 by a distance about equal to the radius of the shank of an adjusting tool. The cover then provides a reaction or support surface to facilitate rotation of the tool about the axis 76.

Figure 35:
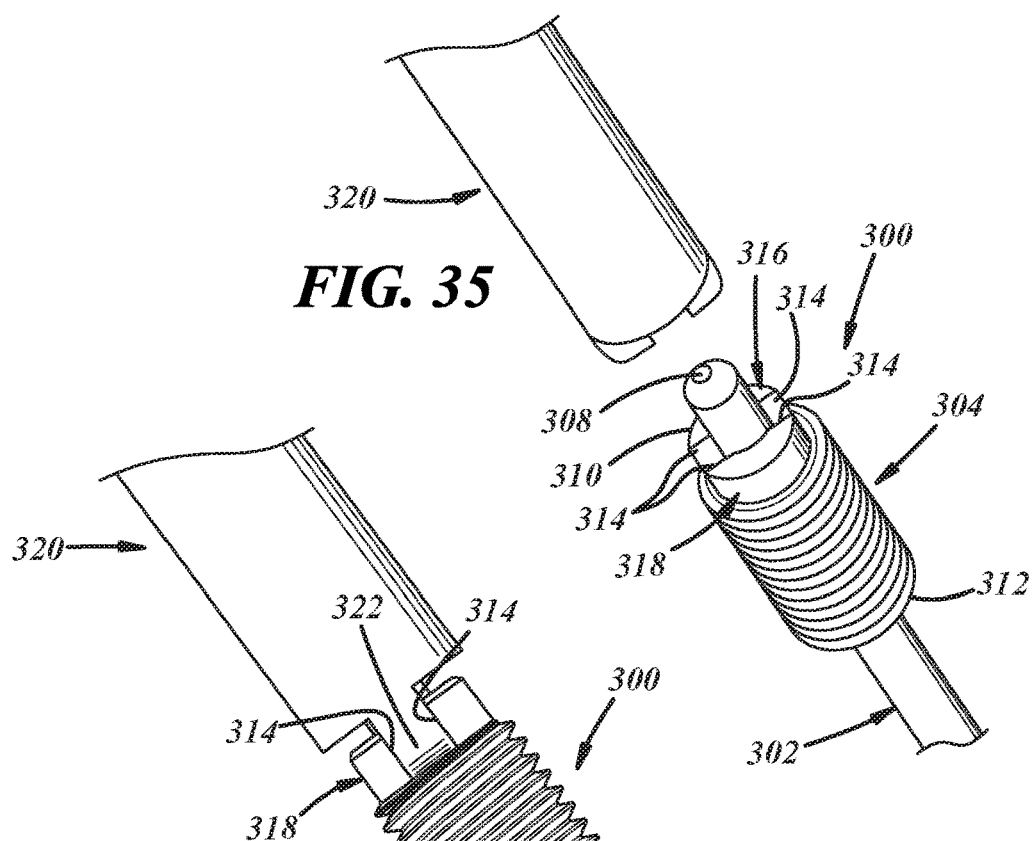
FIG. 35 is a perspective, exploded view showing a portion of an adjustment valve and a tool that may be used to rotate the adjustment valve.
Figure 36:
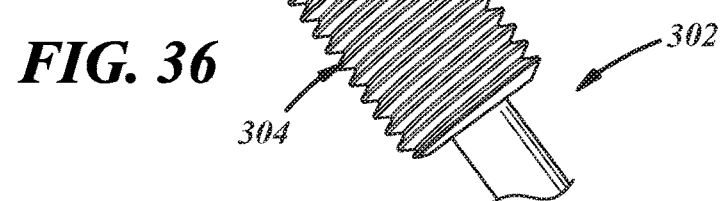
FIG. 36 is a side view of the adjustment valve and tool of FIG. 35 showing the tool engaged with the adjustment valve.
Figure 37:
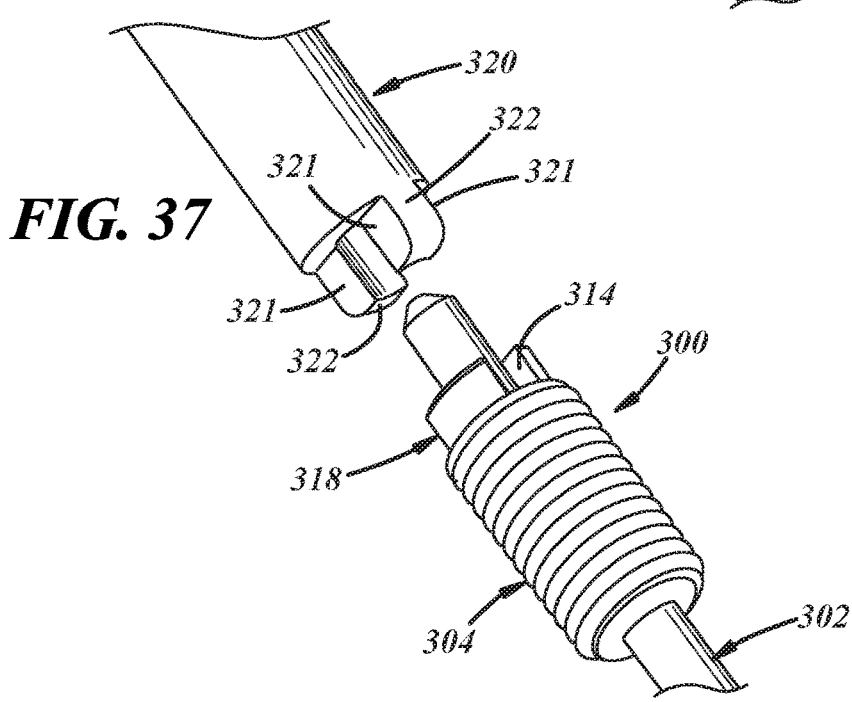
FIG. 37 is perspective, exploded view of the adjustment valve and tool of FIG. 35.
Figure 38:
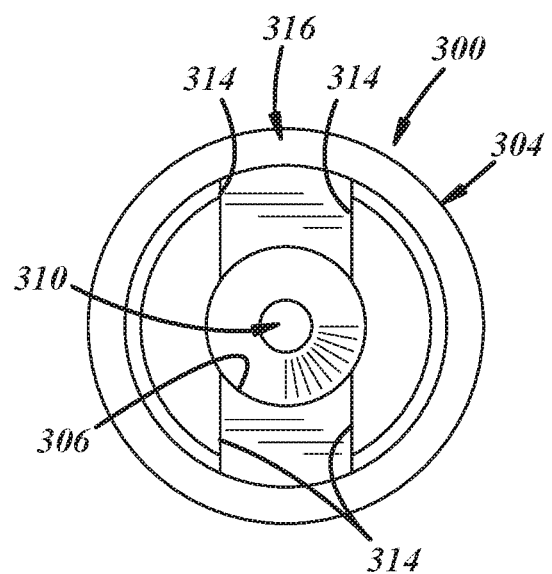
FIG. 38 is an end view of the adjustment valve.

FIGS. 35-37 illustrate an adjustment valve 300 having a needle 302 and a valve body 304 constructed for receipt in a threaded bore 58 in the throttle valve 12 or in a bore 59 of an insert (e.g. insert 60 as shown in FIGS. 3 and 4, or other insert for example) carried by the throttle valve 12. The needle 302 may extend through a cavity or passage 306 (labeled in FIG. 38) in the valve body 304 such that the first end 308 of the needle 302 is located axially outboard of the valve body 304 and spaced from a first end 310 of the valve body 304 and the second end of the needle 302 is located axially outboard of the valve body 304 and spaced from a second end 312 of the valve body 304, and a portion of the needle 302 between its first end and second end is received within the valve body 304. So arranged, the portion of the needle 302 that extends out of the first end 310 of the valve body 304 and including the first end 308 of the needle 302, defines a projection which may be coaxially arranged relative to the valve body 304 and throttle valve axis 76.

The valve body 304 may include one or more drive surfaces 314 axially spaced from the first end 308 of the needle 302 by at least 1 mm and up to 20 mm. The drive surfaces 314 may be provided at the first end 310 of the valve body 304, and may be defined by one or more voids 316 in the first end 310 of the valve body 304. In the implementation shown, the valve body 304 includes a drive portion 318 having a slot 316 that is open to the first end 310 of the valve body 304 and which intersects the passage 306. The drive surfaces 314 are defined by inwardly facing (e.g. facing toward the axis) surfaces that define the slot 316 that are located radially outboard of the needle 302. The slot 316 may have a width (longest radial dimension in the slot) that is greater than the diameter of the needle 302 at the first end 308 so that the surfaces that define the slot 316 define the one or more drive surfaces 314 arranged radially spaced from the needle 302 and passage 306. In the implementation shown in FIGS. 35-38, the slot 316 is linear, and the drive portion 318 and slot 316 have a width greater than the diameter of the needle 302, and drive surfaces 314 are defined on radially opposed sides of the needle 302.

Figure 39:
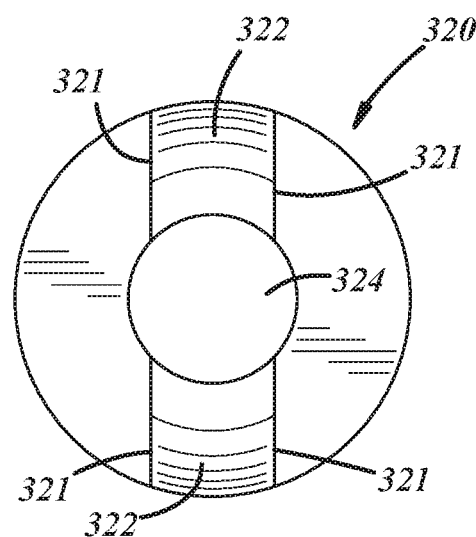
FIG. 39 is an end view of the tool.

Correspondingly, a tool 320 includes one or more driving surfaces 321 arranged to engage the drive surfaces 314 of the valve body 304. In the example shown, the tool 320 includes two fingers 322 that are spaced apart by a distance sufficient to receive the first end 308 of the needle 302 between the fingers 322. The fingers 322 have an axial length sufficient to engage the drive surfaces 314 when the tool 320 is received over the first end 308 of the needle 302. In that regard, the tool 320 may include a central cavity 324 (FIG. 39) in which at least a portion of the needle 302 is received to facilitate engaging the drive surfaces 314 with a tool 320 having shorter fingers 322 which may be stronger and/or easier to form than longer fingers. In at least some implementations, the distance that the needle 302 extends out of the valve body 304 may be equal to or greater than the axial length of the fingers 322. The end 308 of the needle 302 when received in the cavity 324 may also provide a guide for rotation of the tool 320 relative to the adjustment valve. In at least some implementations, the tool 320 must have a diameter less than the cavity (e.g. bore 59 in insert 60) in which it is received to engage the valve body 304, which may be between 2 mm and 5 mm in diameter. With a needle 302 having a diameter of between 0.8 mm and 2.5 mm, the fingers 322 may be between about 0.5 mm and 1.75 mm in radial width (parallel to the slot width) and between 0.5 mm and 1.25 mm thick (transverse to the width, and not in the axial dimension). Instead of the needle 302 projecting from the first end 310 of the valve body 304, the valve body 304 may include a projection such as is in, for example, in the embodiments shown in FIGS. 3-5 and 8-11. The projection could thus, be formed as part of the valve body 304 or separately formed and fixed to the valve body.

Figure 40:
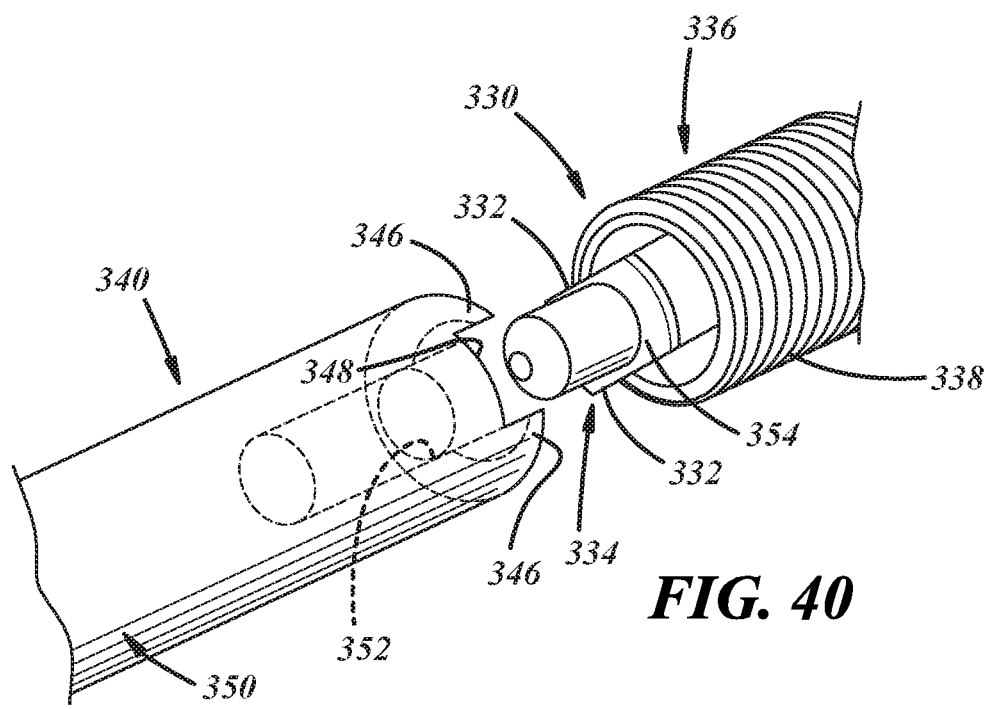
FIG. 40 is a perspective, exploded view showing a portion of an adjustment valve and a tool that may be used to rotate the adjustment valve.
Figure 41:
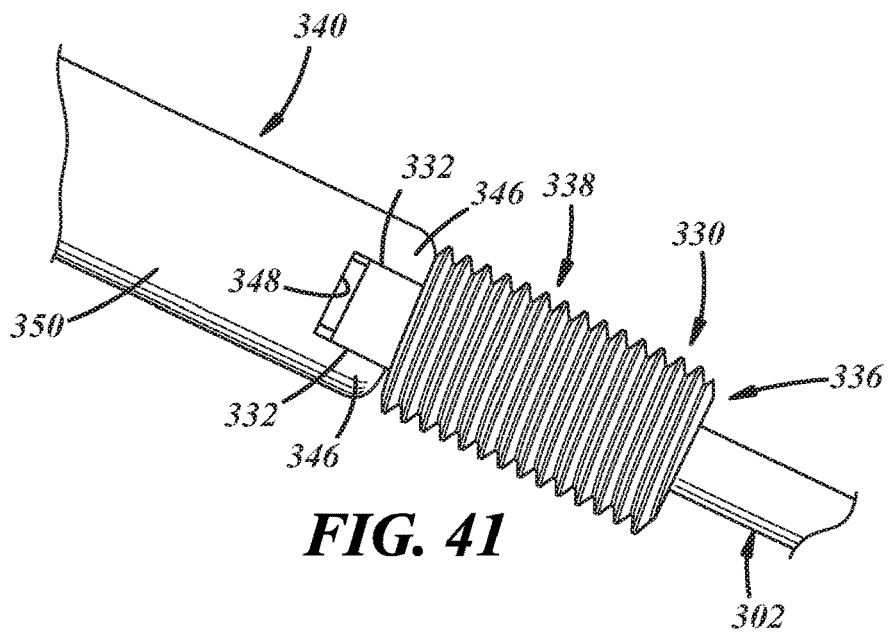
FIG. 41 is a side view of the adjustment valve and tool of FIG. 40 showing the tool engaged with the adjustment valve.
Figure 42:
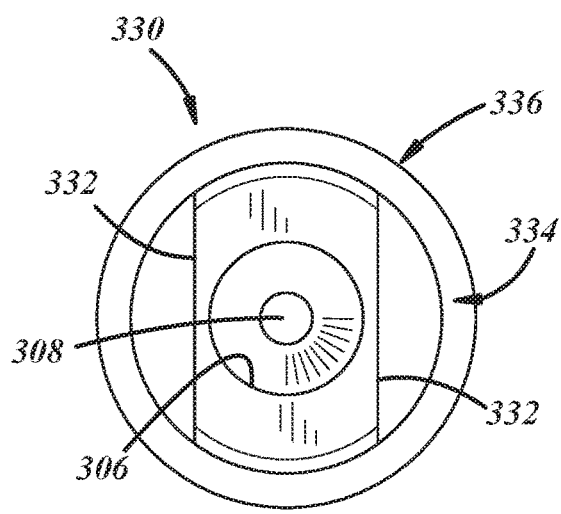
FIG. 42 is an end view of the adjustment valve.
Figure 43:
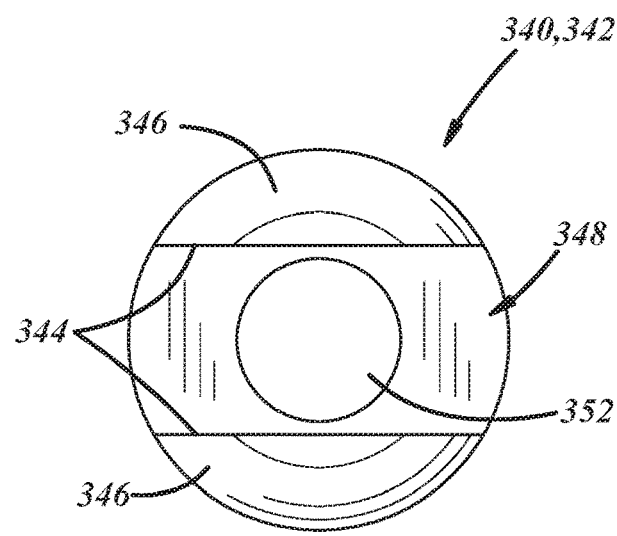
FIG. 43 is an end view of the tool.
Figure 44:
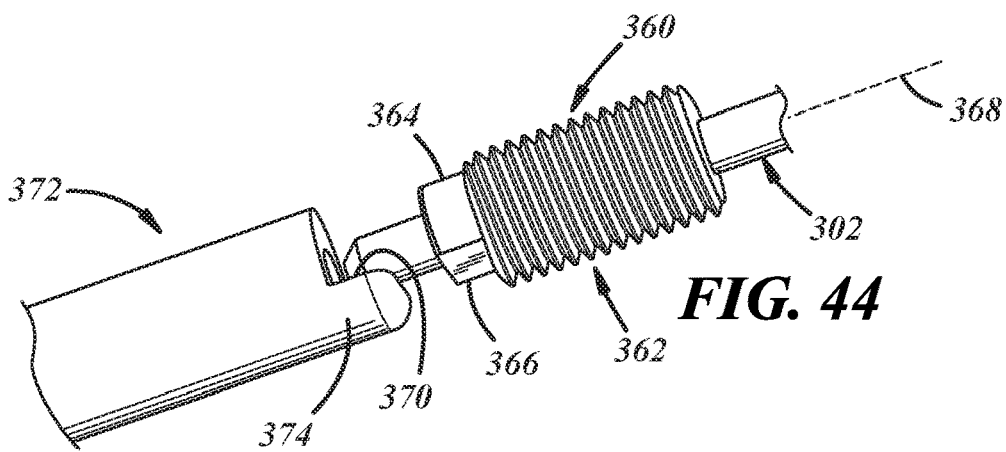
FIG. 44 is a perspective, exploded view showing a portion of an adjustment valve and a tool that may be used to rotate the adjustment valve.

Instead of the inwardly facing drive surfaces 314 defined in or by the slot 316, an adjustment valve 330 may include one or more drive surfaces 332 that face radially outwardly from a drive portion 334 or other part of an adjustment valve body 336, as shown in FIGS. 40-42. In this example, the drive portion 334 includes a portion of the valve body 336 that extends axially from the threaded portion 338 and the drive portion includes one or more drive surfaces 332 defined by an outer surface of the drive portion 334, with two, oppositely facing surfaces 332 shown in the illustrated embodiment. While the drive surfaces 332 are shown as being linear, they may be contoured, have differently angled linear segments or any other desired orientation that permits rotational driving of the adjustment valve 330 by a tool 340 engaging the drive surfaces 332. In the example shown, the tool 340 includes a working end 342 that has one or more driving surfaces 344 defined by fingers 346 spaced apart by a distance sufficient to receive the first end 308 of the needle 302 between the fingers 346. As shown in FIGS. 40, 41 and 43, a slot 348 formed in a cylindrical shank 350 of the tool 340 may define the fingers 346, and a central cavity 352 may be provided to receive at least part of the portion of the needle 302 extending out of the first end 354 of the valve body 336, if desired. In this regard, the tool 320 described with reference to FIGS. 35-39 may be used to rotate the adjustment valve 330. Further, while the needle 302 is shown as extending through the adjustment valve body 336 with both ends of the needle 302 exposed, the first end 308 of the needle 302 could be axially overlapped by the valve body 336 and the valve body 336 may include a projection as described above with reference to FIGS. 35-39.

In FIGS. 44-47, the adjustment valve 360 has a valve body 362 that includes a drive portion 364 or other part having one drive surface 366 arranged radially spaced from the axis 368 of rotation of the needle 302 and axially offset from the first end 308 of the needle 302 or other projection that extends axially beyond the drive portion 364. The drive surface 366 is not circular or part of a circle and has at least a portion that defines a radially varied surface (e.g. portions at different radial distances from the axis 368). The drive surface 366 is arranged to engage with a complementary driving surface 370 of a tool 372 during at least a portion of a rotation of the tool, and after such engagement, further rotation of the tool 372 will rotate the adjustment valve 360. In the example shown, the tool 372 includes an axially extending finger 374 having a radially variable driving surface 370 that is complementary in shape to at least part of the drive surface 366, and which is arranged radially spaced from an axis 368 of the tool 372. The tool 372 may also include a cavity 376 (FIGS. 45 and 47) in which the first end 308 of the needle 302 is received to guide and stabilize rotation of the tool 372. As shown in FIG. 45, when the tool 372 is in position to rotate the adjustment valve 360, the driving surface 370 is axially overlapped with and confronts the drive surface 366 so that these surfaces become engaged when the tool 372 is rotated which causes the adjustment valve 360 to co-rotate with the tool 372.

Figure 49:
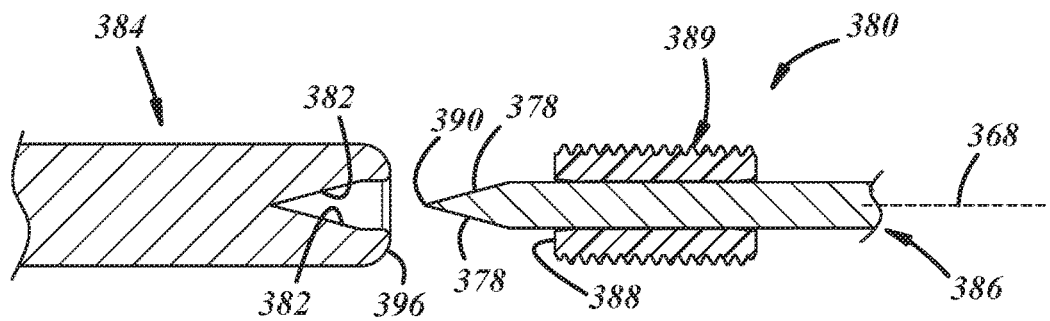
FIG. 49 is a side sectional view of the adjustment valve and tool of FIG. 48.
Figure 50:
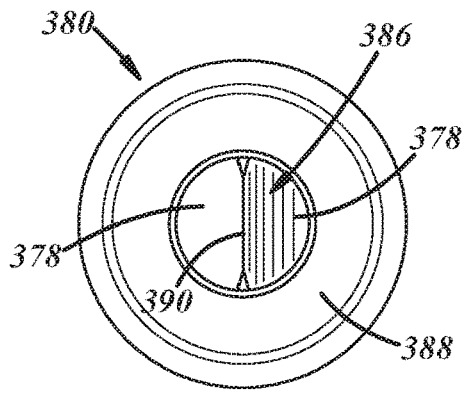
FIG. 50 is an end view of the adjustment valve.
Figure 51:
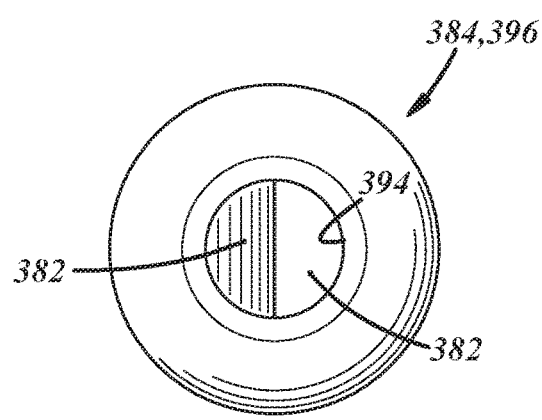
FIG. 51 is an end view of the tool.
Figure 52:
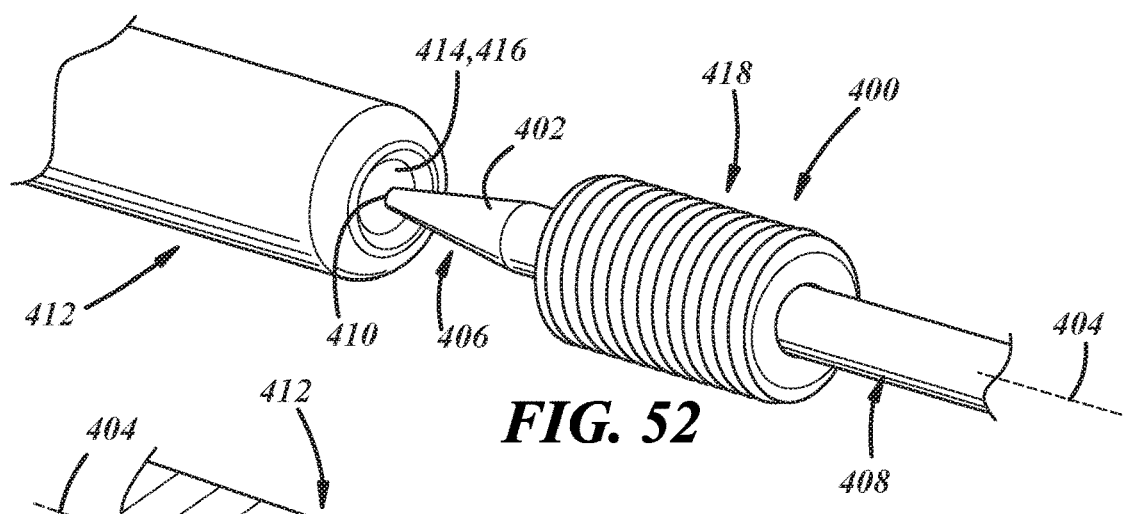
FIG. 52 is a perspective, exploded view showing a portion of an adjustment valve and a tool that may be used to rotate the adjustment valve.
Figure 53:
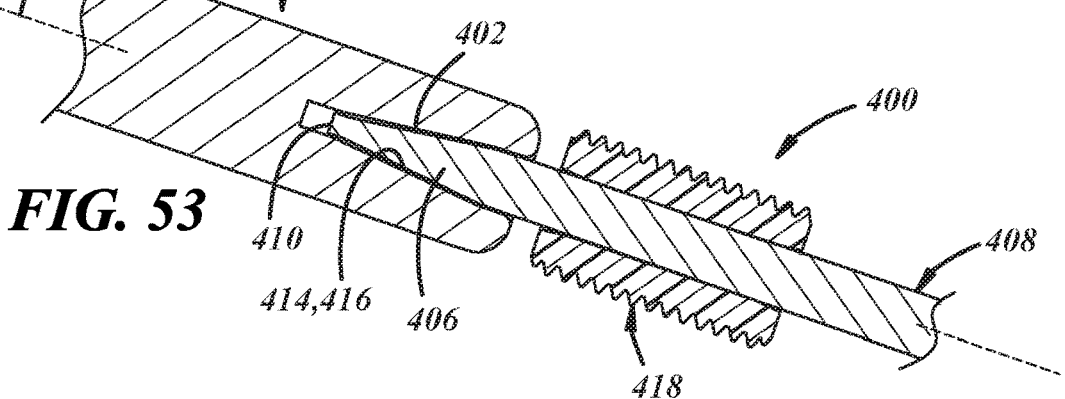
FIG. 53 is a side sectional view of the adjustment valve and tool of FIG. 52 showing the tool engaged with the adjustment valve.

While not required, the drive surfaces 314, 332 and 366 of the adjustment valves 300, 330 and 360 shown in FIGS. 35-44 are arranged in planes that are parallel to the axis 368 of the needle 302 or adjustment valves generally, but radially offset from the axis. In the example shown in FIGS. 48-51, the drive surface(s) 378 of the adjustment valve 380 and the driving surface(s) 382 of a tool 384 that may be used to rotate the adjustment valve 380 about the axis 368 are arranged at an angle to the axis 368, and may be arranged in planes that intersect the axis 368. FIGS. 48-50 illustrate a needle 386 that has inclined drive surfaces 378 formed in portion of the needle 386 that is extended outwardly from the first end 388 of the adjustment valve body 389. The inclined drive surfaces 378 may extend to the first end 390 of the needle 386 or they may be axially spaced therefrom. As shown, the needle 386 includes two oppositely and outwardly facing drive surfaces 378 that converge at the first end 390 of the needle 386 which is thinner than the nominal diameter of the needle 386. As shown, the first end 390 of the needle 386 is generally wedge shaped. The tool 384 has inwardly facing, inclined driving surfaces 382 arranged to overlap the drive surfaces 378 when the first end 390 of the needle 386 is received within a cavity 394 or between complimentarily shaped fingers of a working end 396 of the tool 384. While shown as being planar, differently shaped inclined drive and driving surfaces 378, 382 may be used. Further, while the drive surfaces 378 are shown as being formed in the needle 386 itself, the valve body 389 could instead include a projection or drive portion having the inclined drive surface(s) 378, as desired.

The implementation of an adjustment valve 400 as shown in FIGS. 52-55 is similar to the valve 380 in that the drive surfaces 402 are inclined and not parallel to the axis of rotation 404 of the valve 400. But in this implementation, the one or more drive surfaces 402 are defined by or on a conical or frustoconical portion 406 of the needle 408, which may include the first end 410 of the needle 408. The tool 412 has a complementary conical or frustoconical cavity 414 that defines the one or more driving surfaces 416 that are arranged to frictionally engage the drive surface(s) 402 of the adjustment valve 400 to permit rotation of the adjustment valve 400 by the tool 412. While the drive surfaces 402 are shown as being formed in the needle 408 itself, the valve body 418 could instead include a projection or drive portion having the inclined drive surface(s) 402, as desired.

In the example shown in FIGS. 56-59, the adjustment valve 420 includes a valve body 422 that has one or more radially variable drive surfaces 424 radially spaced from the axis 426 of rotation of the adjustment valve 420. In this example, the drive surfaces 424 are defined by a void 428 formed in and extending axially from the first end 430 of the needle 432. At least part of the void 428 is open to the radial periphery of the needle 432 at a location axially spaced from the threaded portion 434 of the adjustment valve body 422. The void 428 includes at least one axially extended drive surface 424 formed in a plane parallel to the axis 426 and radially offset from the axis 426. In the example shown, two such drive surfaces 424 are provided in radially spaced apart and parallel planes. While shown as being parallel to the axis 426, the drive surfaces 424 could be inclined or not parallel to the axis 426.

The tool 440 may include a working end 442 with a cavity 444 in which the first end 430 of the needle 432 is received. The tool cavity 444 may include a projection 446 arranged to be received within the void 428 of the needle 432, and shown as extending axially along and radially inwardly from a surface 448 of the tool in and defining at least part of the cavity 444. Opposite outer surfaces of the projection 446 define driving surfaces 450 that are arranged adjacent to the drive surfaces 424 when the tool 440 is installed over the first end 430 of the needle 432. The remainder of the tool cavity 444 may, if desired, be defined by a wall or surface 448 at a constant radial dimension from the axis 426. Thus, the radial outer surface 452 of the needle 432 (not including the void 428) and the inner surface 448 of the tool 440 that defines the cavity 444 may be complementary and may facilitate stable, axial rotation of the tool 440, that, with the projection 446 received within the void 428, rotates the adjustment valve 420. While the void 428 and drive surface(s) 424 are shown as being formed in the needle 432 itself, the valve body 422 could instead include a projection or drive portion having the void and drive surface(s) formed therein, as desired. Further, more than one void 428 may be provided, circumferentially spaced apart on the needle 432 or adjustment valve body 422. If desired, the tool 440 may have more than one projection 446, or just one projection 446 of the tool 440 may be aligned with any one void 428 in the adjustment valve 420 to permit rotation of the adjustment valve 420 by the tool 440.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A valve for a charge forming device, comprising:
a needle having a first end and a second end;
a valve body having an axis extending between a first end and a second end, a cavity open to the second end and in which part of the needle is received with the second end of the needle extending out of the second end of the valve body; and
a projection extending axially from the first end of the valve body to a free end of the projection, and the valve body has at least one drive surface axially spaced from the free end of the projection, the drive surface extends axially and radially and the projection is intersected by the axis.

2. The valve of claim 1 wherein the projection is defined by the needle and the first end of the needle defines the free end of the projection.

3. The valve of claim 1 wherein the projection is coaxial with the valve body.

4. The valve of claim 1 wherein the at least one drive surface includes at least two drive surfaces that are defined on opposite sides of the projection.

5. The valve of claim 4 wherein the drive surfaces define at least part of a slot formed in the first end of the valve body.

6. The valve of claim 5 wherein the drive surfaces face inwardly toward axis.

7. A valve for a charge forming device, comprising:
a needle having a first end and a second end;
a valve body having an axis extending between a first end and a second end, a cavity open to the second end and in which part of the needle is received with the second end of the needle extending out of the second end of the valve body; and
a projection extending axially from the first end of the valve body to a free end of the projection, and the valve body has at least one drive surface axially spaced from the free end of the projection, the drive surface extends axially and radially, wherein the at least one drive surface includes at least two drive surfaces that are defined on opposite sides of the projection and wherein the drive surfaces face outwardly away from the axis.

8. The valve of claim 7 wherein the drive surfaces extend radially beyond the projection.

9. The valve of claim 8 wherein the needle defines the projection and the first end of the needle defines the free end of the needle.

10. A valve for a charge forming device, comprising:
a needle having a first end and a second end;
a valve body having an axis extending between a first end and a second end, a cavity open to the second end and in which part of the needle is received with the second end of the needle extending out of the second end of the valve body; and
a projection extending axially from the first end of the valve body to a free end of the projection, and the valve body has at least one drive surface axially spaced from the free end of the projection, the drive surface extends axially and radially and wherein a portion of the exterior of the valve body is threaded.

11. The valve of claim 10 wherein the valve body includes a drive portion that extends axially from the threaded portion of the valve body.

12. A tool for rotating a valve that has a projection extending axially beyond a drive surface to be engaged by the tool, the tool comprising:
a body having an axis, one or more driving surfaces and a cavity formed in the body, the cavity extending axially into the body between the driving surfaces and arranged to receive at least part of the projection, the driving surfaces extending axially and radially and arranged to engage a surface of a valve upon rotation of the tool.

13. The tool of claim 12 wherein the driving surfaces face outwardly, away from the axis.

14. The tool of claim 12 wherein the driving surfaces face inwardly, toward from the axis.

15. The tool of claim 12 wherein the driving surfaces are arranged on opposite sides of the cavity.

16. The tool of claim 12 wherein the body includes a pair of fingers with the cavity extending between the fingers, and with the driving surfaces defined by the fingers.

17. The tool of claim 16 wherein the axis extends between the fingers and the driving surfaces are parallel to the axis.

18. The tool of claim 16 wherein the cavity defines part of the fingers.

19. A rotary throttle valve carburetor, comprising:
a body defining a fuel and air mixing passage, a throttle valve chamber communicating with the fuel and air mixing passage and a fuel flow path communicating a supply of fuel with the fuel and air mixing passage;
a throttle valve rotatably and axially movably received in the throttle valve chamber and including a throttle valve passage variably aligned with the fuel and air mixing passage; and
an adjustment valve threadedly carried by the carburetor in communication with the fuel flow path to restrict fuel flow through at least a portion of the fuel flow path in at least one position of the throttle valve, the adjustment valve having a valve body with a threaded portion, at least one drive surface that defines a first engagement portion and a second engagement portion radially spaced from the first engagement portion, the adjustment valve also having a needle carried by the valve body for movement with the valve body, and the adjustment valve having a projection extending axially from an end of the valve body and axially beyond the at least one drive surface.

20. The carburetor of claim 19 wherein the throttle valve defines a cavity in which the valve body is received so that the at least one drive surface is located within the cavity and is surrounded by a body of the throttle valve.

* * * * *